(12) United States Patent
Itoi

(10) Patent No.: US 10,818,055 B2
(45) Date of Patent: Oct. 27, 2020

(54) COMPUTER READABLE MEDIA, INFORMATION PROCESSING APPARATUS AND INFORMATION PROCESSING METHOD

(71) Applicant: HOBONICHI CO., LTD., Tokyo (JP)

(72) Inventor: Shigesato Itoi, Tokyo (JP)

(73) Assignee: HOBONICHI CO., LTD., Tokyo (JP)

( * ) Notice: Subject to any disclaimer, the term of this patent is extended or adjusted under 35 U.S.C. 154(b) by 0 days.

(21) Appl. No.: 16/013,445

(22) Filed: Jun. 20, 2018

(65) Prior Publication Data

US 2019/0147631 A1    May 16, 2019

(30) Foreign Application Priority Data

Nov. 14, 2017   (JP) ................. 2017-219032

(51) Int. Cl.
  *G06T 11/60*   (2006.01)
  *G06K 9/00*   (2006.01)
  *G06K 9/20*   (2006.01)

(52) U.S. Cl.
  CPC .......... *G06T 11/60* (2013.01); *G06K 9/00671* (2013.01); *G06K 9/2063* (2013.01)

(58) Field of Classification Search
  CPC ...................... G06T 11/60; G06K 9/00671
  See application file for complete search history.

(56) References Cited

U.S. PATENT DOCUMENTS 5,945,985 A * 8/1999 Babin ................. G09B 29/106
  715/209
10,140,739 B1 * 11/2018 Burgin ................... G06F 16/00

2007/0244634 A1 * 10/2007 Koch ..................... G01C 21/00
2012/0195506 A1 * 8/2012 Kim ....................... G06Q 10/00
  382/195
2012/0249762 A1 * 10/2012 Exner ................... G06F 3/0304
  348/61

(Continued)

FOREIGN PATENT DOCUMENTS

JP   2005-284882 A    10/2005
JP   2005284882 A  * 10/2005
(Continued)

OTHER PUBLICATIONS

J P-2005284882-A (Machine Translation on Apr. 8, 2019) (Year: 2005).*

(Continued)

*Primary Examiner* — Michael Le
(74) *Attorney, Agent, or Firm* — Rudy J. Ng; Bret E. Field; Bozicevic, Field & Francis LLP

(57) ABSTRACT

An object of the present disclosure is to provide a computer readable media including program instructions for displaying various contents in a superimposed manner in a region corresponding to a subject in a photographed image.

An information processing apparatus obtains a photographed image by photographing a subject of an earth ball having a marker on a surface thereof. The information processing apparatus recognizes, based on the marker, the earth ball in the photographed image thus obtained. The information processing apparatus displays, on the recognized earth ball in the photographed image, a content image in such a manner as to cover the whole region of the earth ball.

16 Claims, 28 Drawing Sheets

(56) References Cited

U.S. PATENT DOCUMENTS

| | | | |
|---|---|---|---|
| 2014/0155156 A1* | 6/2014 | Peck | A63F 13/12 463/31 |
| 2014/0229862 A1 | 8/2014 | St. Clair | |
| 2014/0267226 A1* | 9/2014 | Yoon | G06T 11/206 345/419 |
| 2015/0153934 A1* | 6/2015 | Zherebtsov | G06F 16/00 715/810 |
| 2015/0235397 A1* | 8/2015 | Beckman | G06T 11/206 345/440 |
| 2017/0004651 A1* | 1/2017 | Xiong | G06F 1/1605 |
| 2019/0295299 A1* | 9/2019 | Park | H04N 5/23206 |

FOREIGN PATENT DOCUMENTS

| | | | |
|---|---|---|---|
| JP | 2013-92407 A | | 5/2013 |
| JP | 2013-140547 A | | 7/2013 |
| JP | 2013140547 A | * | 7/2013 |
| JP | 2016-517054 A | | 6/2016 |
| JP | 2017-117082 A | | 6/2017 |
| JP | 2017117082 A | * | 6/2017 |
| JP | 2017-522682 A | | 8/2017 |
| WO | WO2014126949 A1 | | 8/2014 |

OTHER PUBLICATIONS

JP-2013092407-A (Machine Translation on Jul. 29, 2019) (Year: 2013).*

JP-2017117082-A (Machine Translation on Apr. 8, 2019) (Year: 2017).*

Sato, Educational AR globe "Orboot" which is a perfect gift to celebrate kids' entrance into school—Images pop up on the earth, [online] CNTET Japan, Mar. 3, 2017, [searched on May 2, 2018], https://japan.cnet.com/article/35097547/; English translation enclosed.

Web page of the broadcast station program guide (Tokyo Broadcasting System Television, program name is "Gacchiri Monday!!") and the image showing the present invention made public in the program, Oct. 1, 2017; English translation enclosed.

People Co., Ltd., "Kunikyara Chikyugi (Country Characters Terrestrial Globe)", Published Apr. 13, 2016; Retrieved Sep. 17, 2019; Accessible at https://web.archive.org/web/20160413103813/http://www.people-kk.co.jp/toys/chiiku/kare-ouzi.html; along with its English translation, 12 pages.

Office Action for Japanese Patent Application No. 2017-219032, dated Sep. 24, 2019, and its English translation, 24 pages.

* cited by examiner

F I G . 25

| COUNTRY | LOCATION (LONGITUDE, LATITUDE) | GOLD MEDAL | SILVER MEDAL | BRONZE MEDAL |
|---|---|---|---|---|
| JAPAN | (35.70,139.69) | 3 | 4 | 5 |
| CHINA | (39.9,116.3) | 3 | 4 | 5 |
| KOREA | (37.33,126.58) | 2 | 4 | 6 |
| UNITED STATES | (40.43,74.0) | 3 | 4 | 6 |

12d

COMPUTER READABLE MEDIA, INFORMATION PROCESSING APPARATUS AND INFORMATION PROCESSING METHOD

CROSS-REFERENCE TO RELATED APPLICATION

This non-provisional application claims priority under 35 U.S.C. § 119(a) on Patent Application No. 2017-219032 filed in Japan on Nov. 14, 2017, the entire contents of which are hereby incorporated by reference.

FIELD

The present invention relates to a program, an information processing apparatus and an information processing method.

BACKGROUND

In recent years, products using an AR (augmented reality) system have been developed. In the AR system, an application program for recognizing an AR marker is precedently installed in information equipment including a camera and a display unit, such as a smartphone, a tablet terminal and a portable game machine. When an image of a subject provided with an AR marker is photographed by using such information equipment, the information equipment recognizes the AR marker and displays a content corresponding to the recognized AR marker to be superimposed on the photographed image.

Thus, a user can see, in the display unit, an image in which the content is superimposed on the photographed subject. Japanese Patent Application Laid-Open Publication No. 2013-92407 discloses a system in which a three-dimensional object is photographed and additional information of an image, letters or the like is displayed to be superimposed on the three-dimensional object in the photographed image.

SUMMARY

With respect to an AR system, various examinations have been made on what is to be selected as a subject and on what content is to be superimposed on a photographed image to be displayed.

The present invention was devised in consideration of these circumstances, and an object is to provide a program and the like to be used for displaying various contents to be superimposed in a region corresponding to a subject in an image.

A computer readable media including program instructions according to one aspect of the present disclosure causes a computer to execute processing for: obtaining a photographed image by photographing a sphere having a marker on a surface thereof recognizing, based on the marker, the sphere in the photographed image obtained; and displaying a content image in such a manner as to cover a whole region of the recognized sphere in the photographed image.

A computer readable media including program instructions according to another aspect of the present disclosure causes a computer to execute processing for: obtaining a photographed image by photographing a sphere having a marker on a surface thereof recognizing, based on the marker, the sphere in the photographed image obtained; and displaying, on the recognized sphere in the photographed image, a plurality of content images each including time information in such a manner that the content images are superimposed in an order of day and time corresponding to the time information.

According to one aspect of the present disclosure, various contents can be displayed to be superimposed in a region corresponding to a sphere in a photographed image of the sphere, and hence, a user can get enjoyment in his/her own way.

The above and further objects and features will more fully be apparent from the following detailed description with accompanying drawings.

BRIEF DESCRIPTION OF THE DRAWINGS

FIG. 25 is an explanatory diagram illustrating an exemplified record layout of a medal DB.

DETAILED DESCRIPTION

A program and the like of the present disclosure will now be specifically described with reference to the accompanying drawings illustrating embodiments thereof.

Embodiment 1

Figure 1:
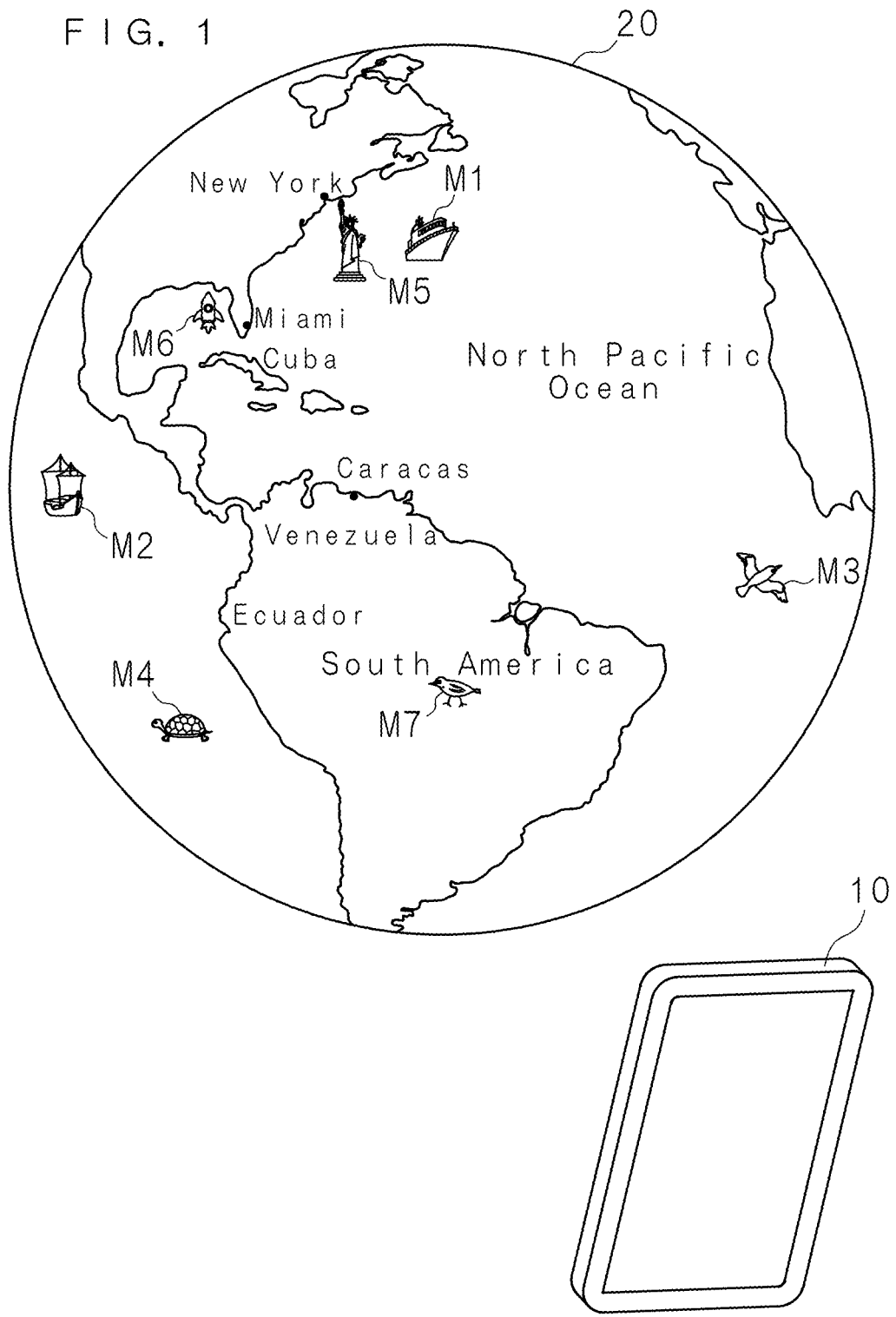
FIG. 1 is a schematic diagram illustrating a structure example of an AR system.

FIG. 1 is a schematic diagram illustrating a structure example of an AR system. In the AR system of the present embodiment, an earth ball 20 that is a sphere having AR markers (markers) thereon is used as a subject to be photographed with an image processing apparatus 10. The earth ball 20 is, but is not limited to, for example, a PVC (polyvinyl chloride) ball formed into a spherical shape by filling air therein. On a surface of the earth ball 20, for example, a map of the earth is printed, and AR markers are provided in appropriate positions on the map. For example, in a map exemplified in FIG. 1, seas and continents are respectively provided with their names, and countries and cities are respectively provided with their names. Each of these words corresponds to the AR marker. Besides, although not illustrated in FIG. 1, borders between the countries are included in the map, and each of these borders also corresponds to the AR marker. Furthermore, landforms such as rivers, plains and mountain ranges are distinguishably colored in the map, and each of these colors also corresponds to the AR marker. In addition, the seas included in the map are respectively provided with prescribed marks M1 to M4 (such as ship marks M1 and M2 and marks M3 and M4 of animals such as a turtle and a seagull) for distinguishing respective seas and sea areas. Besides, the continents included in the map are provided with prescribed marks M5 to M7 for distinguishing respective continents and land areas. Each of these marks M1 to M7 also corresponds to the AR marker.

Figure 2:
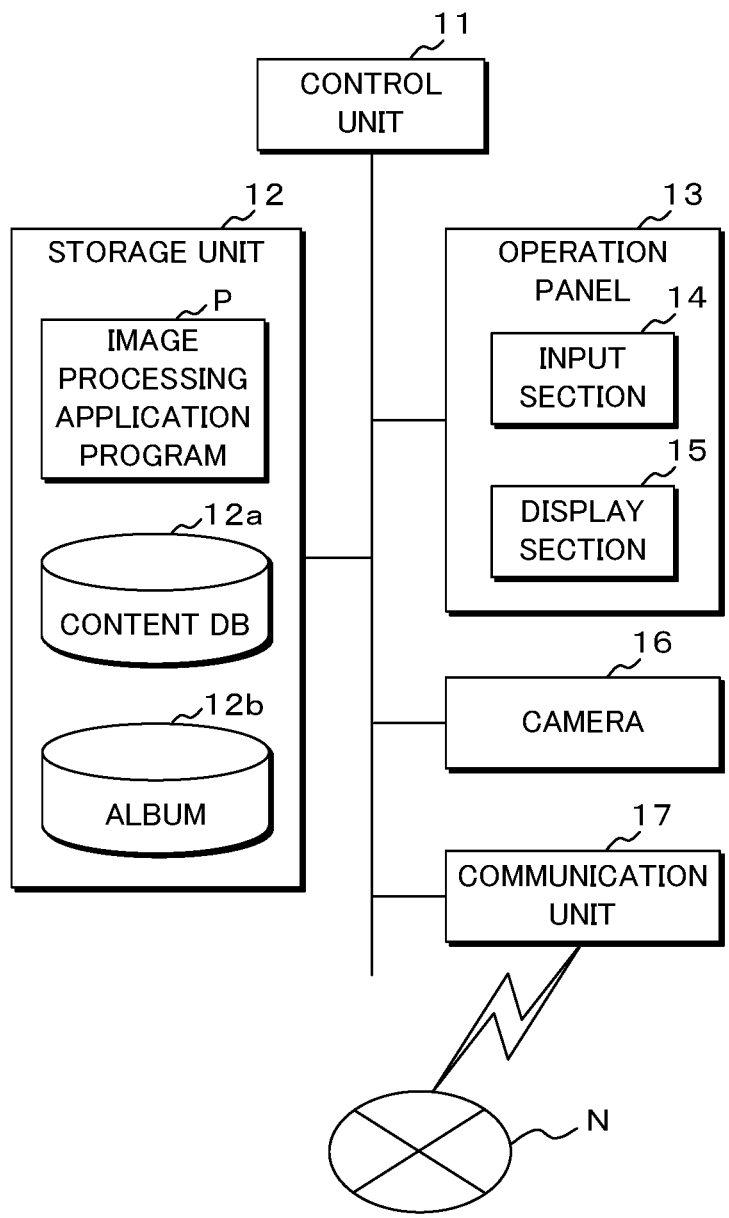
FIG. 2 is a block diagram illustrating a structure example of an information processing apparatus.

FIG. 2 is a block diagram illustrating a structure example of the information processing apparatus 10. The information processing apparatus 10 is information equipment such as a smartphone, a tablet terminal, a personal computer or a game machine, and if it is portable information equipment, it is easily operated. The information processing apparatus 10 includes a control unit 11, a storage unit 12, an operation panel 13, a camera 16, a communication unit 17 and the like, and these elements are connected to one another via buses. The control unit 11 includes a processor such as a CPU (a central processing unit) or an MPU (a micro-processing unit). The control unit 11 performs various information processing, control processing and the like of the information processing apparatus 10 by appropriately executing control programs stored in the storage unit 12.

The storage unit 12 includes a RAM (a random access memory), a flash memory, a hard disk, an SSD (a solid stage drive) and the like. The storage unit 12 precedently stores the control programs to be executed by the control unit 11 and various data and the like necessary for the execution of the control programs. Besides, the storage unit 12 temporarily stores data and the like generated during the execution of a control program by the control unit 11. The control programs to be stored in the storage unit 12 include an image processing application program (hereinafter simply referred to as the image processing application) P, that is, the program of the present disclosure. Besides, the data to be stored in the storage unit 12 include a content DB 12a and an album 12b. It is noted that the content DB 12a may be incorporated into the image processing application P or may be stored in a storage device capable of communicating with the information processing apparatus 10 via a network N. Besides, the album 12b may be stored in a storage device capable of communicating with the information processing apparatus 10 via the network N.

The content DB 12a stores contents of letters, images and the like, and each content is stored correspondingly to information identifying any of the AR markers provided on the earth ball 20 or location information (longitude and latitude) corresponding to a location on the earth. The album 12b stores contents such as still images and movies taken by a user with the information processing apparatus 10 and still images and movies received from an external apparatus through the communication unit 17. Each of the contents such as the still images and the movies is stored in the album 12b in association with time information corresponding to day and time of photographing or day and time of creating, and location information such as a place of photographing or creating, or a place corresponding to the content. Incidentally, a still image or a movie not having time information and location information may be stored in the album 12b. Besides, the contents to be stored in the album 12b include, for example, a rectangular panoramic image obtained by developing, by equirectangular projection in a plane, an omnidirectional image photographed with an omnidirectional camera, and a rectangular panoramic image obtained by developing, by the equirectangular projection in a plane, a synthesized image of photographs taken in all-around directions of a subject.

The operation panel 13 is a touch panel integrally including an input section 14 and a display section 15. The input section 14 is a touch sensor disposed on a surface of the display section 15, and receives an input operation performed by a user and transmits a control signal corresponding to the content of the operation to the control unit 11. The display section 15 is, for example, a liquid crystal display, an organic EL (electroluminescence) display or the like, and displays various information in accordance with an instruction issued by the control unit 11. The input section 14 and the display section 15 may be constituted as separate components.

The camera 16 includes a lens, an image sensor and the like, and obtains electronic data (image data) by photoelectric conversion, using the image sensor, of light entering through the lens. The camera 16 performs a photographing operation in accordance with an instruction issued by the control unit 11, and transmits obtained image data (photographed images) successively to the control unit 11. Incidentally, the image processing apparatus 10 may employ, instead of the structure including the camera 16, a structure including a connection section to which an external camera can be connected. In this case, the connection section receives input of image data photographed with the external camera, and transmits the input image data successively to the control unit 11. The communication unit 17 is an interface to be connected to a network such as the Internet, and transmits/receives information to/from an external apparatus via the network.

The information processing apparatus 10 may obtain the image processing application P from an external apparatus via the communication unit 17 to store it in the storage unit 12. Alternatively, when the information processing apparatus 10 includes a reading unit or the like for reading information stored in a portable storage medium, the image processing application P may be read from a portable storage medium to be stored in the storage unit 12. Furthermore, the information processing apparatus 10 may be HMD (head mounted display) type information equipment using, as the display section 15, a goggle or eyeglass type head mounted display. In this case, a microphone for voice input and an eye tracking type input device detecting a gaze of a user or the like are preferably used as the input section 14. The information processing apparatus 10 may be any equipment as long as it is information equipment including the camera 16 and the display section 15.

Figure 3:
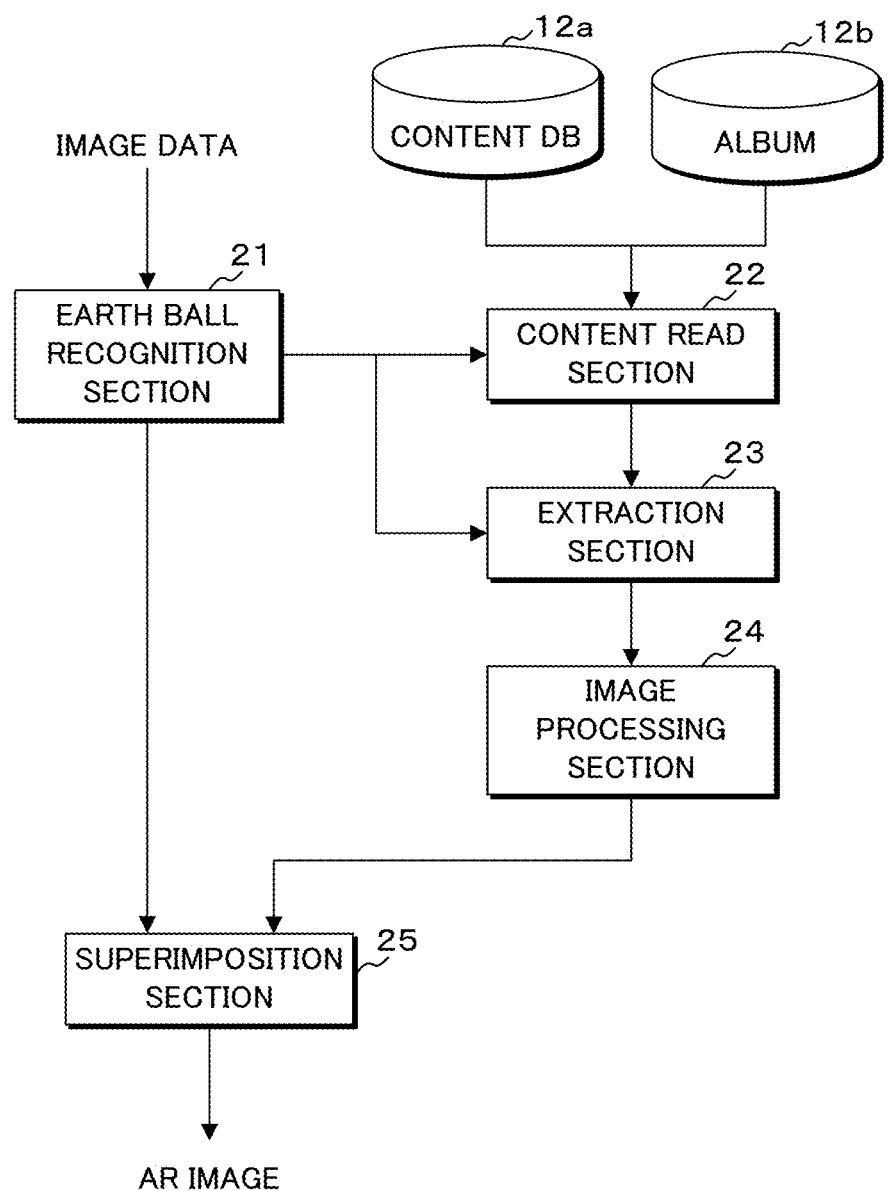
FIG. 3 is a block diagram illustrating functions realized by a control unit of the information processing apparatus.

Now, functions realized in the information processing apparatus 10 when the control unit 11 executes the image processing application P will be described. FIG. 3 is a block diagram illustrating the functions realized by the control unit 11 of the information processing apparatus 10. When the control unit 11 of the information processing apparatus 10 executes the image processing application P stored in the storage unit 12, functions of an earth ball recognition section 21, a content read section 22, an extraction section 23, an image processing section 24, and a superimposition section 25 are realized. Incidentally, in the present embodiment, these functions are realized by the control unit 11 executing the image processing application P, but a part of these may be realized by a dedicated hardware circuit.

When an instruction to execute the image processing application P is received from a user through, for example, the operation panel 13 (the input section 14), the control unit 11 of the information processing apparatus 10 starts a photographing operation with the camera 16. When the photographing operation is started, the camera (acquisition unit) 16 obtains photographed images at prescribed timing (of, for example, every 1/30 seconds or 1/15 seconds).

The earth ball recognition section (recognition section) 21 recognizes a region of the earth ball 20 in a photographed image taken with the camera 16, and also recognizes a photographing region (photographing range) or the like in the earth ball 20. For example, the earth ball recognition section 21 recognizes a circular shape corresponding to the outline of the earth ball 20 in a photographed image, and thus specifies the outline (region) of the earth ball 20 in the photographed image. Besides, the earth ball recognition section 21 recognizes an AR marker in the photographed image, and specifies the region (photographing range) of the photographed earth ball 20 based on the recognized AR marker. For example, the earth ball recognition section 21 specifies, on the basis of an AR marker, a sea, a continent, a country, a city or the like included in the photographed earth ball 20 (in the photographing range of the earth ball 20). Furthermore, the earth ball recognition section 21 specifies location information (longitude and latitude) on the earth in each position (each point) within the photographing range of the earth ball 20. Incidentally, the image processing application P includes information on positions of the respective AR markers provided on the earth ball 20, such as information on a sea, a continent, a country, a city and the like, or location information on the earth. Therefore, when an AR marker is recognized, the earth ball recognition section 21 can specify location information of the recognized AR marker, and can specify the photographing range of the earth ball 20 based on the specified location information.

The content read section 22 reads contents for generating an AR image from the content DB 12a or the album 12b. For example, the content read section 22 reads, from the content DB 12a, a content corresponding to the AR marker recognized in the photographed image by the earth ball recognition section 21. Besides, the content read section 22 reads, from the album 12b, a content demanded by a user through, for example, the operation panel 13 (the input section 14).

The extraction section 23 extracts, from the content read by the content read section 22 from the content DB 12a or the album 12b, a region corresponding to the photographing range of the earth ball 20 specified by the earth ball recognition section 21. When the content includes, for example, an image corresponding to each position on the earth, the extraction section 23 extracts, from the content, an image according with a region corresponding to the longitude and latitude of the photographing range of the earth ball 20. Specifically, when the photographing range of the earth ball 20 is a prescribed region around Japan, the extraction section 23 extracts, from the content, a portion corresponding to the prescribed region around Japan.

The image processing section 24 performs various image processing on the region extracted from the content by the extraction section 23 (hereinafter simply referred to as the content). For example, the image processing section 24 performs enlargement processing or reduction processing on the content. Besides, the image processing section 24 performs processing for transforming (converting) the content into a circular image for displaying the content in a circular region on the earth ball 20 in the photographed image. Incidentally, when the content to be processed is a rectangular panoramic image developed in a plane by the equirectangular projection, the panoramic image can be restored to an omnidirectional image by subjecting it to the conversion processing into a circular image, and thus, the image can be satisfactorily displayed when displayed in a circular region. Besides, the image processing section 24 may perform various image processing on the content, or may perform processing for adding, to the content, letters or the like manually input by a user through the operation panel 13.

The superimposition section 25 generates an AR image by superimposing a circular content image obtained based on the content having been processed by the image processing section 24 so as to cover the whole region of the earth ball 20 in the photographed image having been specified by the earth ball recognition section 21. In this manner, an AR image in which the circularly processed content is displayed in the whole region of the earth ball 20 in the photographed image obtained by photographing the earth ball 20 with the camera 16 can be generated. The information processing apparatus 10 displays the AR image generated by the superimposition section 25 in the display section 15.

Owing to the above-described functions, the information processing apparatus 10 can generate an AR image in which a content stored in the content DB 12a or the album 12b is superimposed on the earth ball 20 photographed with the camera 16. Incidentally, the extraction section 23 extracts, from the content, a region according with the photographing range of the earth ball 20, and the image processing section 24 performs the image processing on the extracted region. Thus, the content can be superimposed on the earth ball 20 with each position (each point) in the photographing range of the earth ball 20 aligned with corresponding position (corresponding point) in the content.

Figure 4:
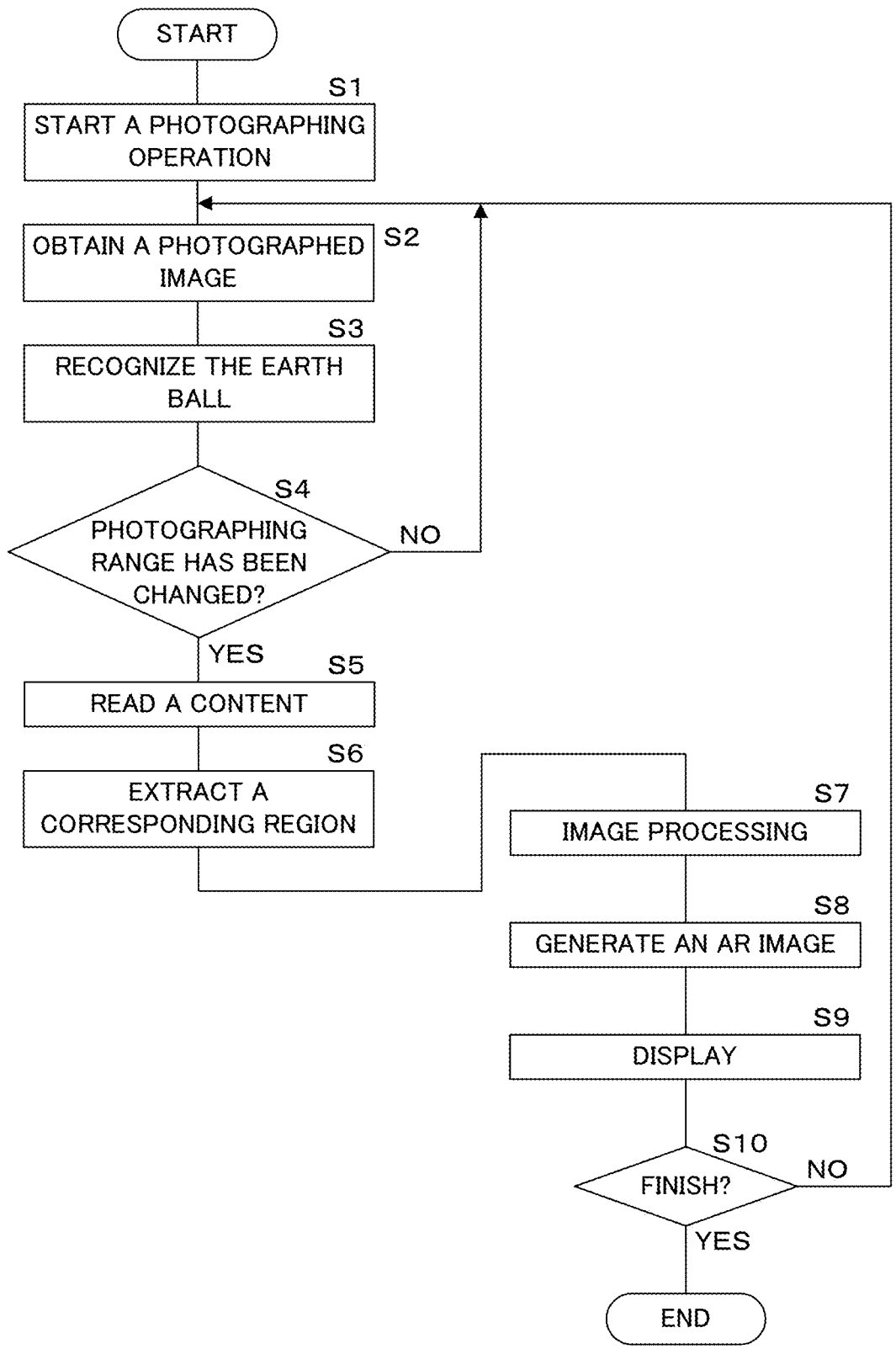
FIG. 4 is a flowchart illustrating procedures in processing performed by the information processing apparatus.

Now, processing for displaying an AR image performed by the information processing apparatus 10 will be described with reference to a flowchart. FIG. 4 is a flowchart illustrating procedures in the processing performed by the information processing apparatus 10, and FIGS. 5 to 8 are schematic diagrams illustrating display examples of the AR image. The following processing is executed by the control unit 11 in accordance with the control program stored in the storage unit 12 of the information processing apparatus 10.

When an instruction to execute the image processing application P is received from a user, for example, through the operation panel 13, the information processing apparatus 10 executes the image processing application P. In the information processing apparatus 10 having started to execute the image processing application P, the control unit 11 starts a photographing operation with the camera 16 (S1). The control unit 11 obtains a photographed image with the camera 16 (S2), recognizes an AR marker in the obtained photographed image, and recognizes the earth ball 20 in the photographed image based on the AR marker and the photographed image (S3). Here, the control unit 11 specifies a region of the earth ball 20 in the photographed image, and a photographing range or the like of the earth ball 20.

The control unit 11 determines whether or not the photographing range has been changed in the recognized earth ball 20 (S4). For example, the control unit 11 stores, in the storage unit 12, the photographing range of the earth ball 20 specified in step S3, and when the photographing range of the earth ball 20 is specified next time, it is determined whether or not the photographing range has been changed from the previous photographing range. If it is determined that the photographing range has not been changed (S4: NO), the control unit 11 returns the processing to the procedure of step S2, and repeats the procedures for obtaining a photographed image at a prescribed timing and recognizing the earth ball 20 based on the obtained photographed image.

If it is determined that the photographing range has been changed (S4: YES), or when the earth ball 20 is recognized for the first time, the control unit 11 reads a content to be used for an AR image from the content DB 12a or the album 12b (S5). The control unit 11 reads, for example, a content according with the earth ball 20 or the AR marker recognized in step S3. The content according with the earth ball 20 or the AR marker is, for example, a content according with a pattern, a map or the like shown in the region of the earth ball 20 in the photographed image, or a content according with the AR marker included in the photographed image. Incidentally, when a content to be used for the AR image is specified by the user through the operation panel 13, the control unit 11 reads the specified content from the album 12b.

Next, the control unit 11 extracts, from the content read in step S5, a region (corresponding region) according with the photographing range of the earth ball 20 specified in step S3 (S6). For example, the control unit 11 extracts, from a content image, an image of a region corresponding to the longitude and latitude in the photographing range of the earth ball 20. Then, the control unit 11 performs the image processing on the region (the content) extracted in step S6 (S7). Here, the control unit 11 performs processing for deforming the content into a circular image so as to be displayed in a circular region on the earth ball 20 in the photographed image. Besides, the control unit 11 generates an AR image by superimposing the circular content image obtained based on the content having been processed in step S7 so as to cover all the region of the earth ball 20 in the photographed image (S8). The control unit 11 displays the thus generated AR image in the operation panel 13 (S9).

The control unit 11 determines whether or not the processing is to be ended (S10). A case of ending the processing is, for example, a case where an ending instruction is received from a user through the operation panel 13. If it is determined that the processing is not to be ended (S10: NO), the control unit 11 returns the processing to the procedure of step S2, and if it is determined that the processing is to be ended (S10: YES), the control unit 11 ends the processing. When the processing is returned to the procedure of step S2, the control unit 11 performs the procedures of steps S3 to S9 every time a photographed image is obtained at the prescribed timing. In this manner, on the basis of photographed images successively obtained with the camera 16, the earth ball 20 is recognized, and contents are superimposed in accordance with the recognized photographing range of the earth ball 20, so as to generate an AR image according with the photographing range of the earth ball 20. Accordingly, when the photographing range of the earth ball 20 is changed by turning the earth ball 20 to be photographed or by changing a direction for photographing the earth ball 20, a content to be superimposed on the earth ball 20 is changed on a real-time basis.

Figure 5:
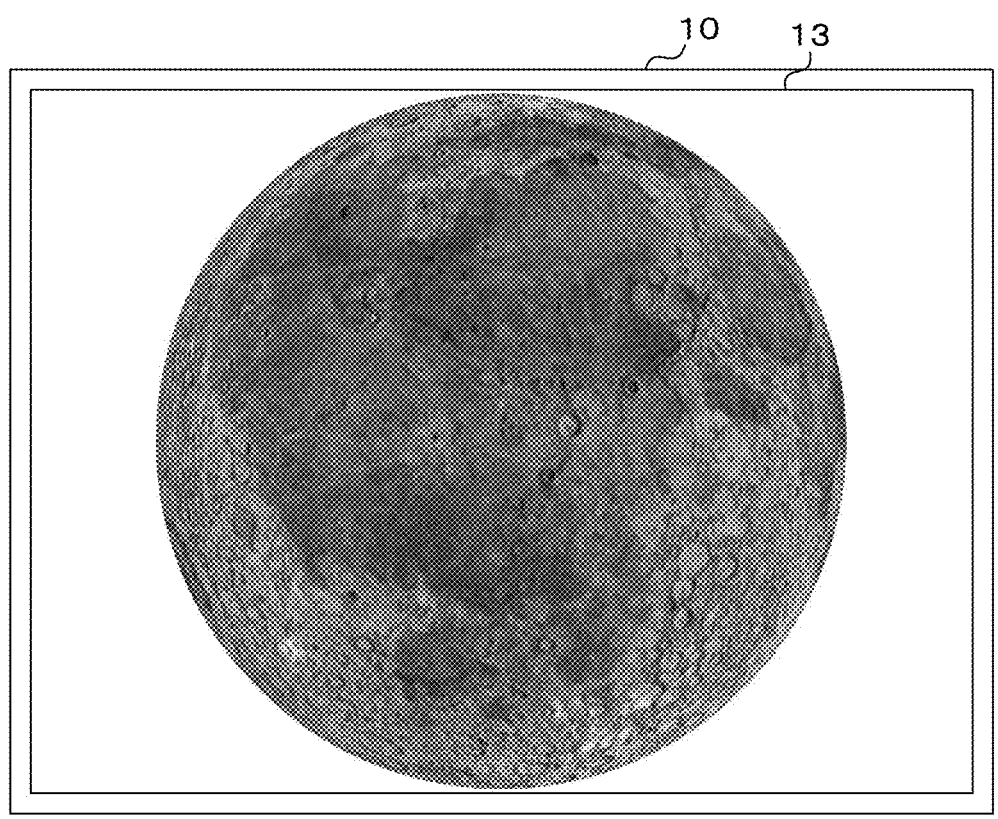
FIG. 5 is a schematic diagram illustrating a display example of an AR image.

FIG. 5 illustrates an example of the AR image obtained when a photograph of the lunar surface taken by the equirectangular projection and presented by NASA (National Aeronautics and Space Administration) is used as the content. When a photograph of the lunar surface taken by the equirectangular projection is used, the control unit 11 extracts, from the content (the photograph of the lunar surface), an image of a region having moon latitude and moon longitude (moon coordinates) corresponding to the latitude and longitude in the photographing range of the photographed earth ball 20. Then, the control unit 11 performs the image processing for deforming the extracted image into a circular shape, and superimposes the resultant in a circular region on the earth ball 20 in the photographed image. In this manner, the AR image of a moon globe as illustrated in FIG. 5 can be generated. Besides, when the photographing range of the earth ball 20 is changed by turning the earth ball 20 to be photographed or by changing the direction for photographing the earth ball 20, the control unit 11 extracts an image of a region according with the changed photographing range from the content (the photograph of the lunar surface). Then, the control unit 11 performs the image processing for deforming the extracted image into a circular shape, and superimposes the resultant in a circular region on the earth ball 20 in the photographed image. In this manner, when the photographing range of the earth ball 20 is changed, the photograph of the lunar surface according with the changed photographing range of the earth ball 20 is superimposed on the earth ball 20. Accordingly, in the AR image of the moon globe as illustrated in FIG. 5, the moon globe can be rotated by changing the photographing range of the earth ball 20, and thus, images of the moon globe taken in various directions can be displayed.

Figure 6A:
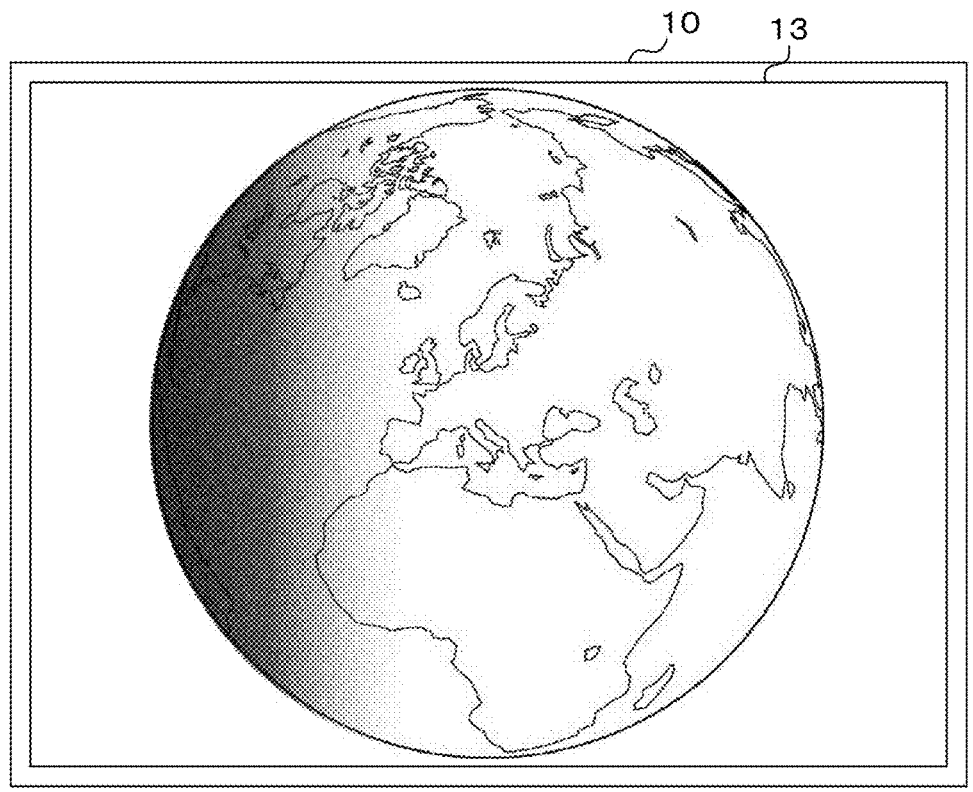
FIG. 6A is a schematic diagram illustrating another display example of the AR image.
Figure 6B:
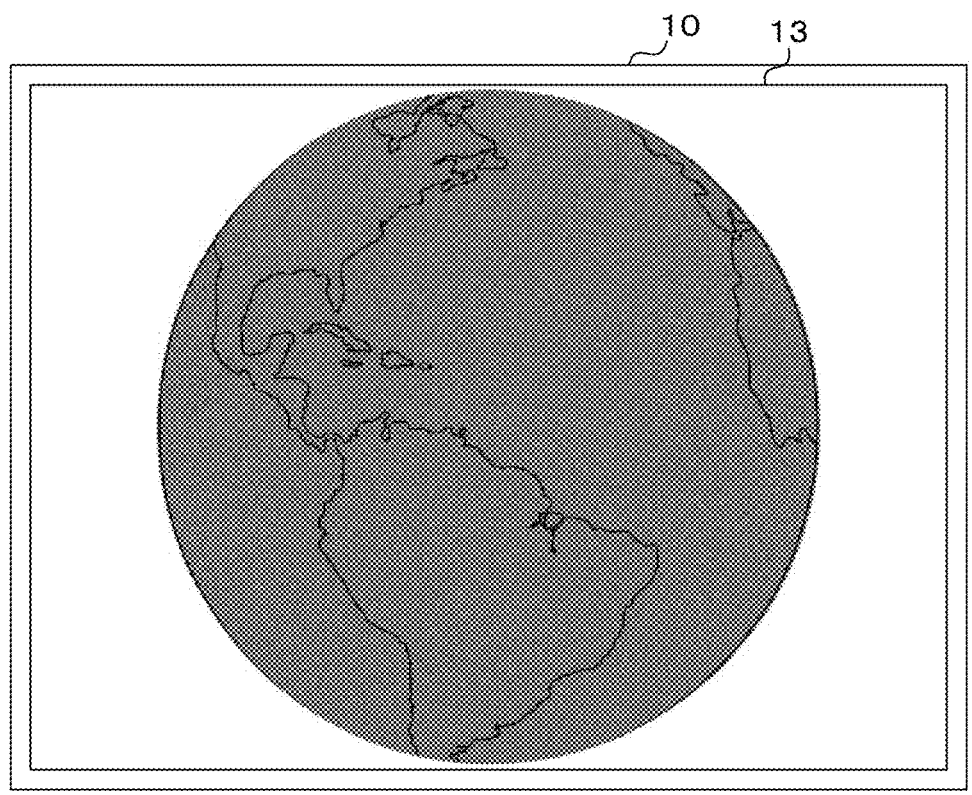
FIG. 6B is a schematic diagram illustrating still another display example of the AR image.

FIGS. 6A and 6B illustrate examples of the AR image obtained when a satellite photograph obtained by synthesizing photographs of the whole surface of the earth taken from a satellite and developing the resultant by the equirectangular projection in a plane is used as the content. When such a satellite photograph is used, the control unit 11 extracts, from the content (the satellite photograph), an image of a region corresponding to the latitude and longitude in the photographing range of the photographed earth ball 20. Then, the control unit 11 performs the image processing for deforming the extracted image into a circular shape, and superimposes the resultant in a circular region of the earth ball 20 in the photographed image. In this manner, the AR image of the earth seen from a satellite can be displayed as illustrated in FIGS. 6A and 6B. Incidentally, FIG. 6A illustrates an example of the satellite photograph obtained when it is daytime in the Eurasian continent and the African continent, and FIG. 6B illustrates an example of the satellite photograph obtained when it is nighttime in the American continent. When the photographing range of the earth ball 20 is changed, while the image as illustrated in FIG. 6A or 6B is being displayed, by rotating the earth ball 20 to be photographed or by changing the direction for photographing the earth ball 20, a satellite photograph according with the changed photographing range of the earth ball 20 is superimposed on the earth ball 20. Accordingly, when the photographing range of the earth ball 20 is changed to South America while the AR image of FIG. 6A is being displayed in the display section 15, the AR image is changed to that of FIG. 6B based on the satellite photograph corresponding to South America. Specifically, in the AR image as illustrated in FIG. 6A or 6B, the earth in the AR image can be rotated in accordance with the rotation of the earth ball 20, and images (photographs) of the earth seen from various directions can be displayed. Incidentally, such a content can be specified based on, for example, Japan standard time, and can be arbitrarily specified by a user.

Figure 7A:
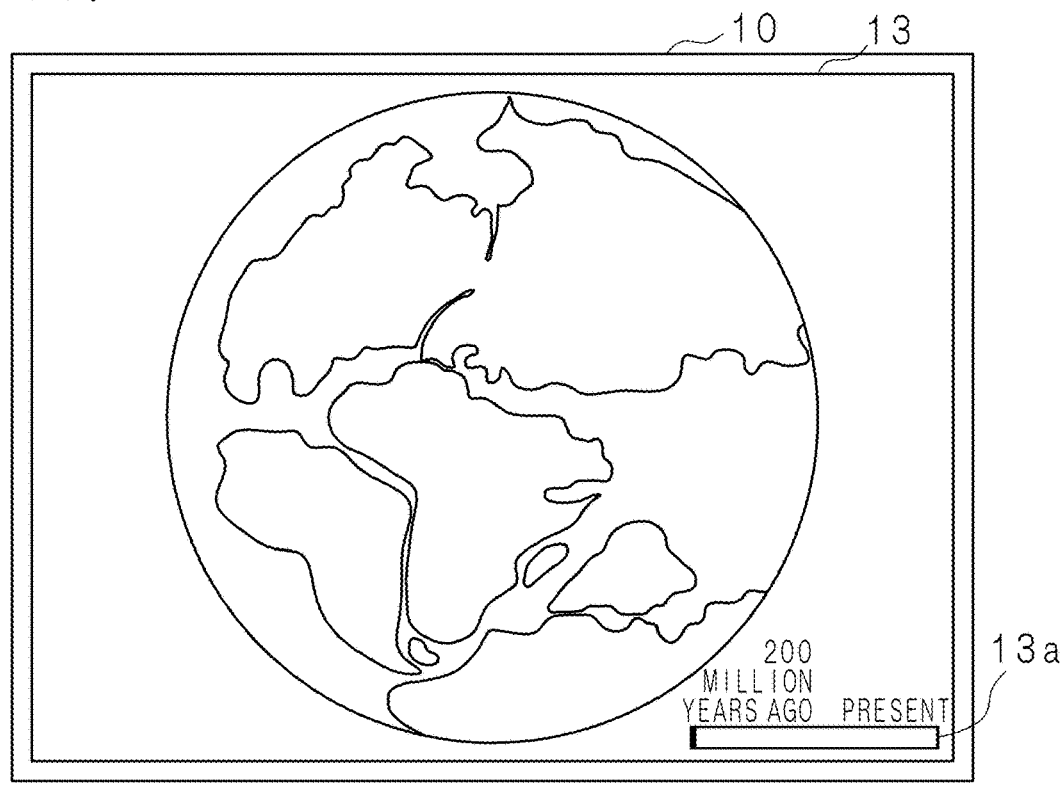
FIG. 7A is a schematic diagram illustrating another display example of the AR image.
Figure 7B:
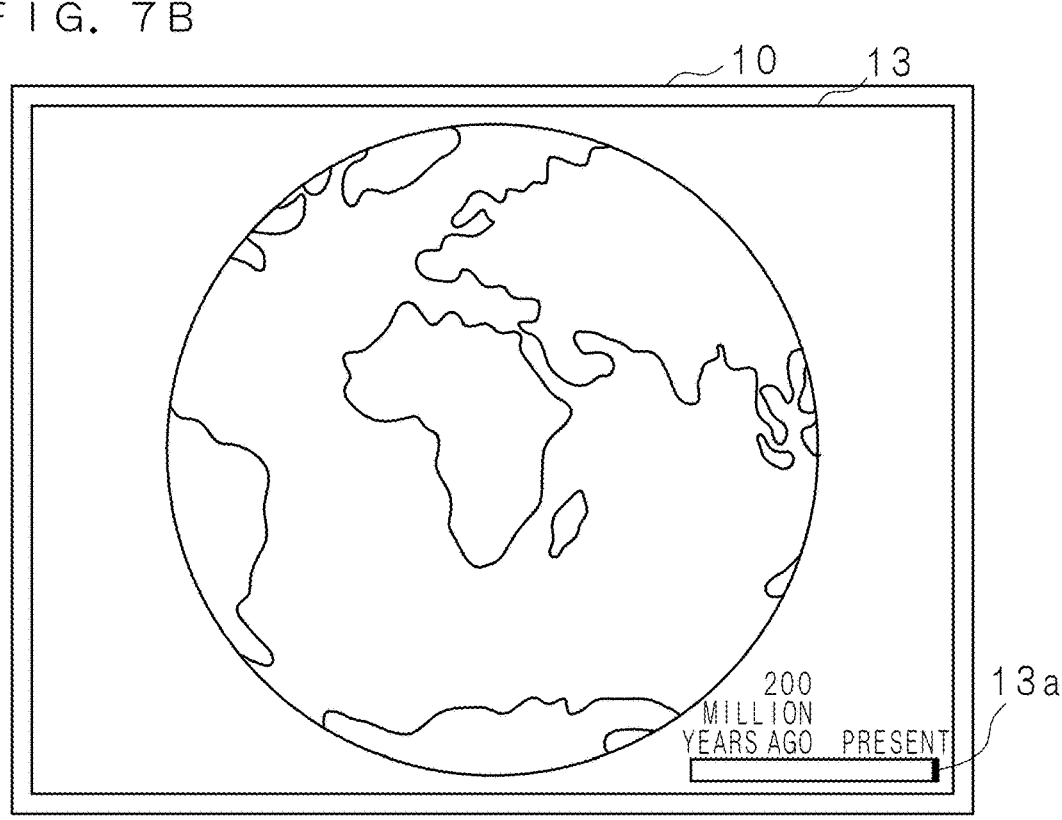
FIG. 7B is a schematic diagram illustrating still another display example of the AR image.

FIGS. 7A and 7B illustrates examples of the AR image obtained when an image corresponding to change over time in the shape of continents (crustal movement) is used as the content. When such an image is used, the control unit 11 extracts, from the content, an image of a region corresponding to the latitude and longitude in the photographing range of the photographed earth ball 20. Then, the control unit 11 performs the image processing for deforming the extracted image into a circular shape, and superimposes the resultant in a circular region on the earth ball 20 in the photographed image. In this manner, the AR image of the continents (the earth) of 200 million years ago corresponding to the photographing range of the earth ball 20 can be displayed as illustrated in FIG. 7A. Incidentally, when the photographing range of the earth ball 20 is changed while the AR image of FIG. 7A is being displayed in the display section 15, an AR image of the continents (the earth) of 200 million years ago corresponding to the changed photographing range is displayed. Accordingly, also in the AR image of FIG. 7A, the earth of 200 million years ago can be also rotated in the AR image in accordance with the rotation of the earth ball 20 to be photographed, and images of the earth of 200 million years ago seen from various directions can be displayed.

Besides, the content of the image corresponding to the crustal movement of the continents includes a plurality of images of the earth of respective eras from 200 million years ago to the present. Therefore, in a display screen of FIG. 7A, an indicator 13a to be used for specifying the era of an image to be displayed in the AR image is displayed. When the indicator 13a is operated through the operation panel 13 in the display screen of FIG. 7A, the control unit 11 extracts, from the image (the content) of the earth of the era specified by the indicator 13a, a region according with the photographing range of the earth ball 20. Then, the control unit 11 performs the image processing on the extracted region (the content) and superimposes the resultant on the earth ball 20 of the photographed image to generate an AR image. In this manner, an image of a place on the continents according with the photographing range of the earth ball 20 in the era specified by the indicator 13a is displayed in the AR image. Incidentally, the display screen of FIG. 7A is an exemplified screen displayed when the earth of 200 million years ago is specified through the indicator 13a, and the display screen of FIG. 7B is an exemplified screen displayed when the current earth is specified. When continuous change in the era is specified through the indicator 13a in the display screen of FIG. 7A or 7B, AR images using images respectively corresponding to the successively specified eras are displayed.

Figure 8:
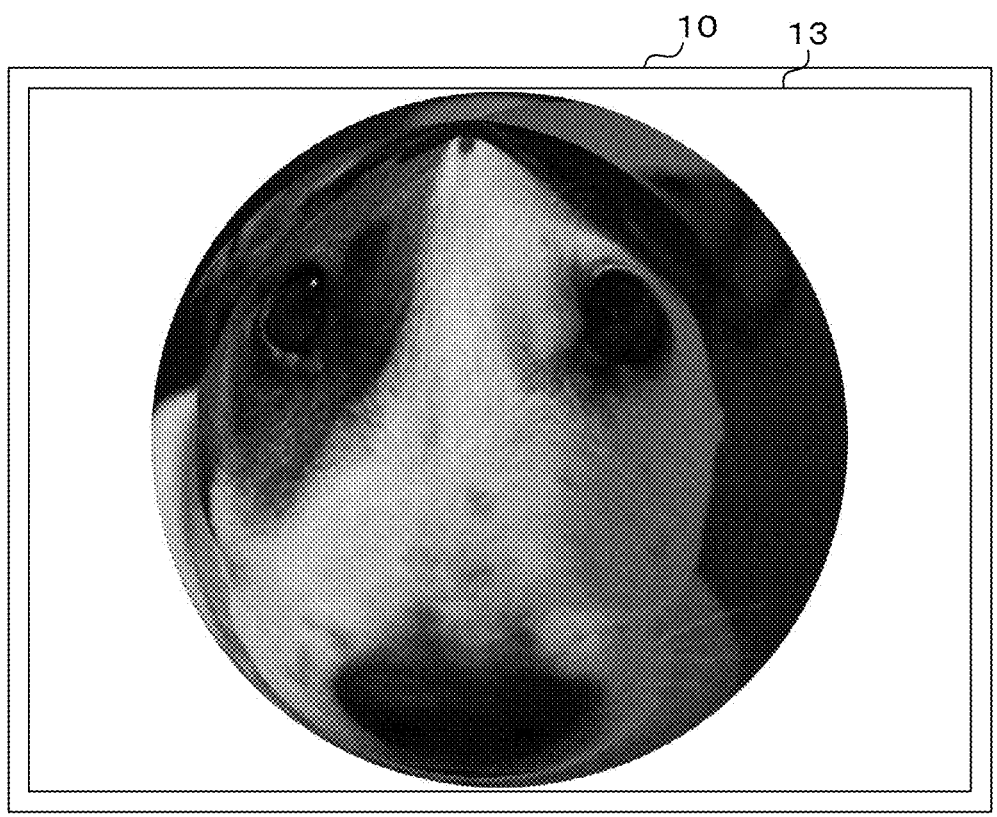
FIG. 8 is a schematic diagram illustrating another display example of the AR image.

FIG. 8 illustrates an example of the AR image obtained when a photograph of a dog taken with, for example, the information processing apparatus 10 is used as the content. When such a photograph is used, the control unit 11 performs merely the image processing for deforming the photograph, for example, in a rectangular shape into a circular shape, and superimposes the resultant in a circular region on the earth ball 20 in the photographed image. Since an arbitrary photograph can be thus used for the AR image, any AR image as desired by a user can be generated, and the user can more enjoy photographs taken by himself/herself. Besides, when a photograph of the whole surface of a subject, such as a photograph of the lunar surface, is used as the content, in accordance with the change in the photographing range of the earth ball 20, a photograph according with the changed photographing range of the earth ball 20 is superimposed on the earth ball 20. Therefore, the photograph (the subject in the photograph) in the AR image can be also rotated by rotating the earth ball 20 to be photographed or by changing the direction for photographing the earth ball 20.

In the present embodiment, in addition to the above-described examples, for example, images corresponding to change over time in borders, territories and names of countries, and images corresponding to change over time in regional divisions and names of the regions of a country may be used as the content. Also in this case, AR images in which the content corresponding to any of the various changes over time is superimposed in a country, a region or the like photographed in accordance with the photographing range of the earth ball 20 can be generated.

In the present embodiment, a content read from the content DB 12a or the album 12b is superimposed to cover the whole region of the earth ball 20 in the photographed image. Therefore, various contents can be displayed by using a circular region on the earth ball 20 as a displaying region. Besides, when the earth ball 20 is seen via the camera 16 and the display section 15 of the information processing apparatus 10, it can be seen as if the various contents were displayed on the earth ball 20. Besides, since a content to be superimposed is changed by changing the photographing range of the earth ball 20, an object in an AR image (such as a moon globe) can be rotated in accordance with the change of the photographing range of the earth ball 20.

Embodiment 2

The present embodiment relates to an information processing apparatus 10 generating an AR image obtained by superimposing, on an earth ball 20, a plurality of contents successively switched. Since the information processing apparatus 10 of the present embodiment has the same structure as the information processing apparatus 10 of Embodiment 1, portions commonly employed in Embodiment 1 will not be described here.

Figure 9:
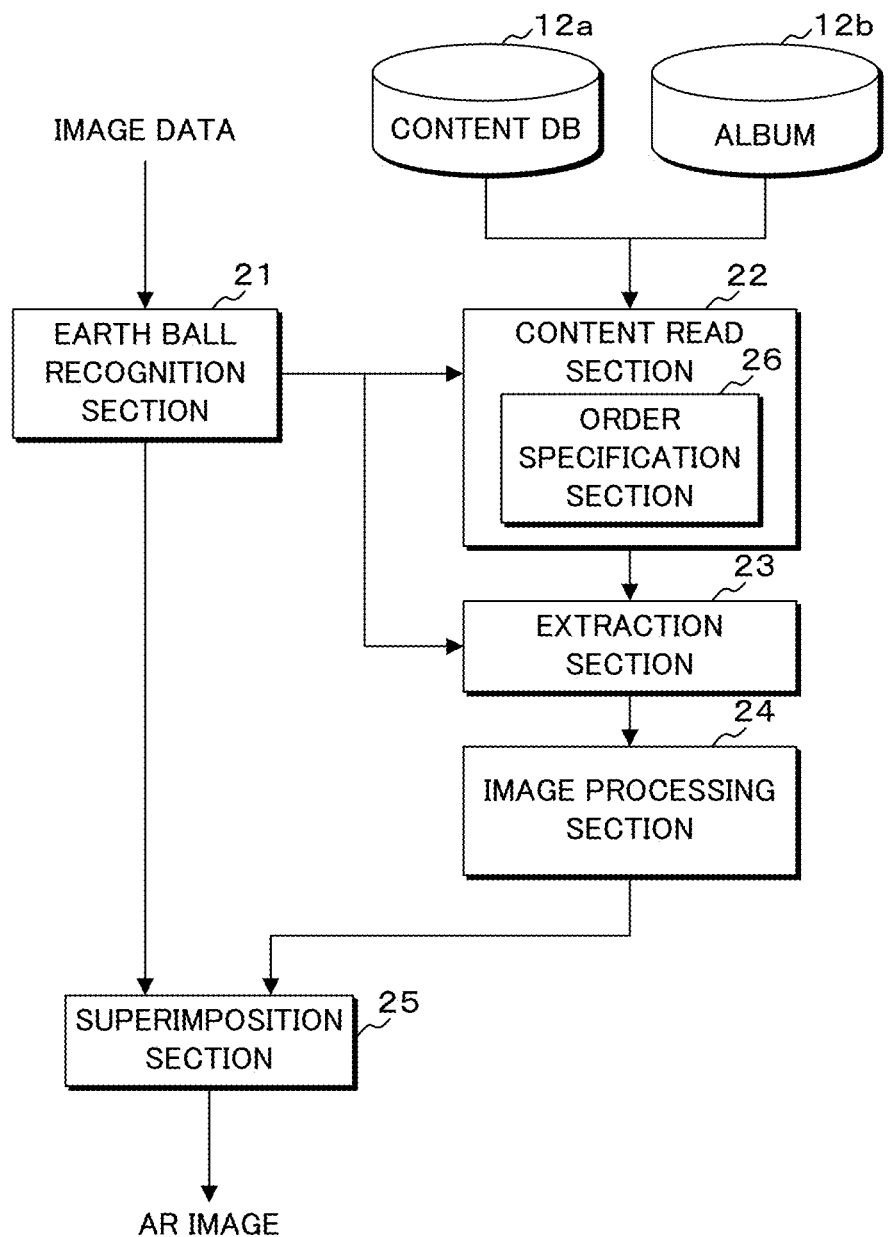
FIG. 9 is a block diagram illustrating functions realized by a control unit of an information processing apparatus according to Embodiment 2.

FIG. 9 is a block diagram illustrating functions realized by a control unit 11 of the information processing apparatus 10 of Embodiment 2. When an image processing application P is executed, the control unit 11 of the information processing apparatus 10 of the present embodiment realizes functions of an earth ball recognition section 21, a content read section 22, an extraction section 23, an image processing section 24 and a superimposition section 25 in the same manner as in Embodiment 1. Incidentally, the content read section 22 of the present embodiment includes an order specification section 26. Also in the present embodiment, a part of these functions may be realized by a dedicated hardware circuit.

When the content read section 22 reads a plurality of contents from a content DB 12a or an album 12b, the order specification section 26 specifies a reading order (a displaying order) of the contents on the basis of time information of the contents. The time information is not only information corresponding to day and time of creating or photographing the content but also may be information corresponding to a displaying order among related plural contents. The time information is stored in the content DB 12a or the album 12b correspondingly to each of the contents. The order specification section 26 reads, from the content DB 12a or the album 12b, the time information of a content to be read by the content read section 22 from the content DB 12a or the album 12b. The order specification section 26 specifies, on the basis of the read time information, the reading order of the plural contents to be read from the content DB 12a or the album 12b. For example, when the time information corresponds to the displaying order among the respective contents, the order specification section 26 determines the order of reading the respective contents as the order corresponding to the time information of the contents. Alternatively, when the time information corresponds to the day and time of photographing or creating the content, the order specification section 26 determines the order of reading the contents as an order (for example, from the oldest or the newest) of the days and times corresponding to the time information of the respective contents. The content read section 22 reads the contents from the content DB 12a or the album 12b in the order specified by the order specification section 26.

Each of the contents read as described above is subjected to the extraction of a region according with the photographing range of the earth ball 20 by the extraction section 23 and the image processing by the image processing section 24, and thereafter, the resultant is superimposed in a circular region on the earth ball 20 in the photographed image by the superimposition section 25 in the same manner as in Embodiment 1. In this manner, an AR image is generated. Incidentally, the content read section 22 reads the plural contents in the order specified by the order specification section 26, and the extraction section 23, the image processing section 24 and the superimposition section 25 successively perform the respective processing on the contents thus read, so as to generate the AR image. The image processing apparatus 10 switches, at a prescribed timing, the AR images successively generated by the superimposition section 25 to be displayed in the display section 15. In this manner, the AR images generated by superimposing the plural contents successively switched can be displayed on the earth ball 20 photographed with the camera 16 in the present embodiment.

Figure 10:
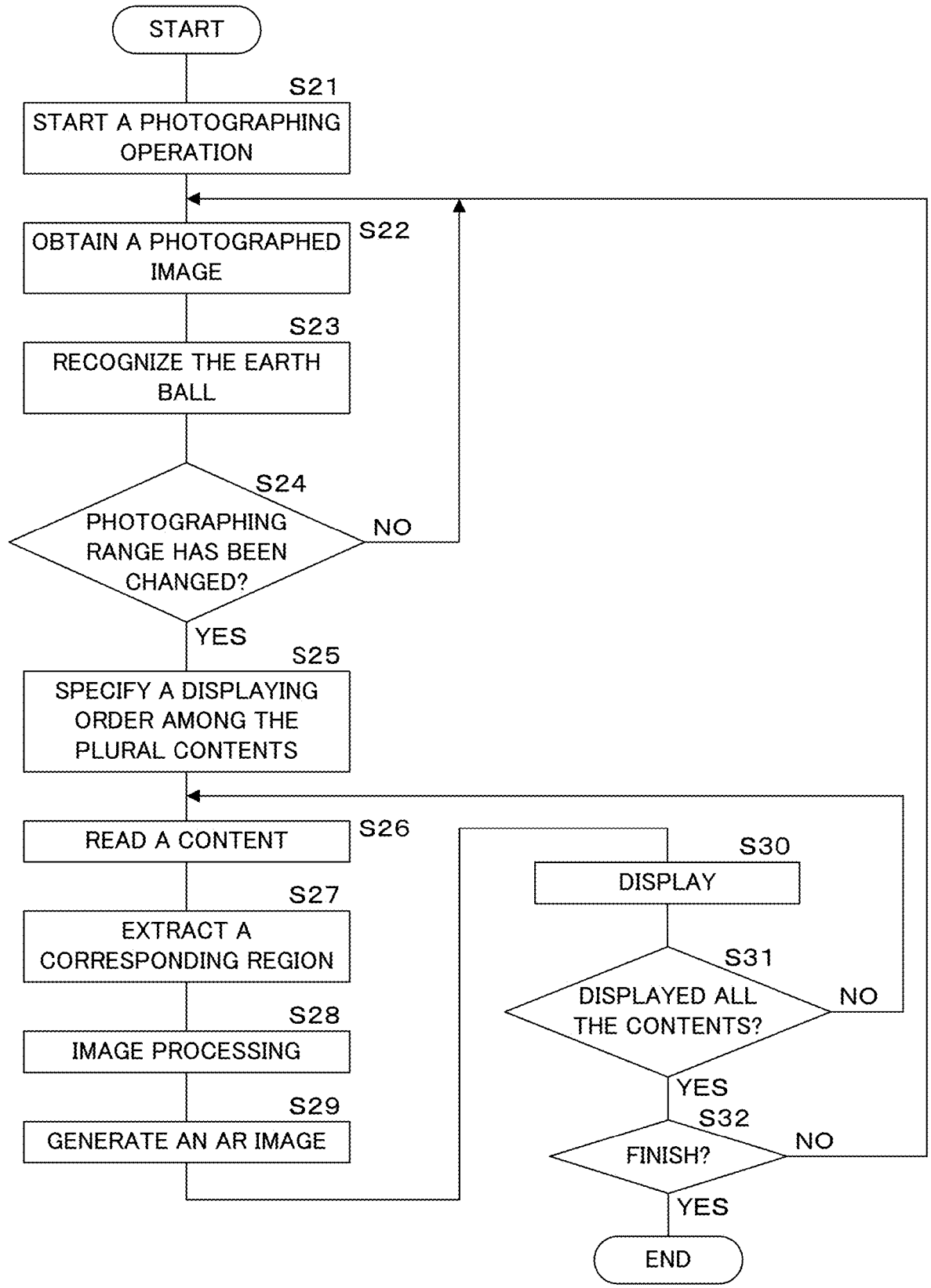
FIG. 10 is a flowchart illustrating procedures in processing performed by the information processing apparatus.

Now, AR image displaying processing performed by the information processing apparatus 10 of the present embodiment will be described with reference to a flowchart. FIG. 10 is a flowchart illustrating procedures in the processing performed by the information processing apparatus 10. The following processing is executed by the control unit 11 in accordance with a control program stored in the storage unit 12 of the information processing apparatus 10. The control unit 11 of the information processing apparatus 10 of the present embodiment performs the same procedures as those of steps S1 to S4 of FIG. 4 (S21 to S24).

If it is determined that the photographing range has been changed (S24: YES), or if the earth ball 20 is recognized for the first time, the control unit 11 specifies a displaying order among the plural contents to be used for an AR image (S25). For example, the control unit 11 reads, from the content DB 12a or the album 12b, the time information of the plural contents to be read from the content DB 12a or the album 12b, and specifies the displaying order among them on the basis of the time information thus read. Incidentally, when contents to be used for the AR image are specified by a user through the operation panel 13, the control unit 11 reads the time information of these contents from the album 12b. Besides, when a content according with the earth ball 20 or the AR marker recognized in step S23 is to be used for the AR image, the control unit 11 reads the time information of this content from the content DB 12a.

The control unit 11 reads one content from the content DB 12a or the album 12b in the specified displaying order (S26), and performs the same procedures as those of steps S6 to S9 of FIG. 4 on the read content (S27 to S30). In this manner, an AR image in which the one content is superimposed on the earth ball 20 is displayed. Then, the control unit 11 determines whether or not the displaying (superimposing) processing has been performed on all the contents to be used for the AR image (S31). If it is determined that the displaying processing for all the contents has not been performed (S31: NO), the control unit 11 returns the processing to the procedure of step S26, and reads, in the displaying order specified in step S25, the next content from the content DB 12a or the album 12b (S26). Then, the control unit 11 performs the procedures of steps S27 to S30 on the content thus read. If it is determined that the processing on all the contents to be used for the AR image has been performed (S31: YES), the control unit 11 determines whether or not the processing is to be ended (S32). If it is determined that the processing is not to be ended (S32: NO), the control unit 11 returns the processing to the procedure of step S22, and if it is determined that the processing is to be ended (S32: YES), the control unit 11 ends the processing.

Through the above-described processing, in the AR image in which the content is superimposed to cover the whole region of the earth ball 20 in the photographed image as illustrated in, for example, FIGS. 5 to 8, the content is switched at a prescribed timing to be displayed. Therefore, since the plural contents can be displayed in a switched manner by using the circular region of the earth ball 20 as the displaying region, an AR image as desired by a user can be generated, and the user can more enjoy photographs taken by himself/herself.

Figure 11A:
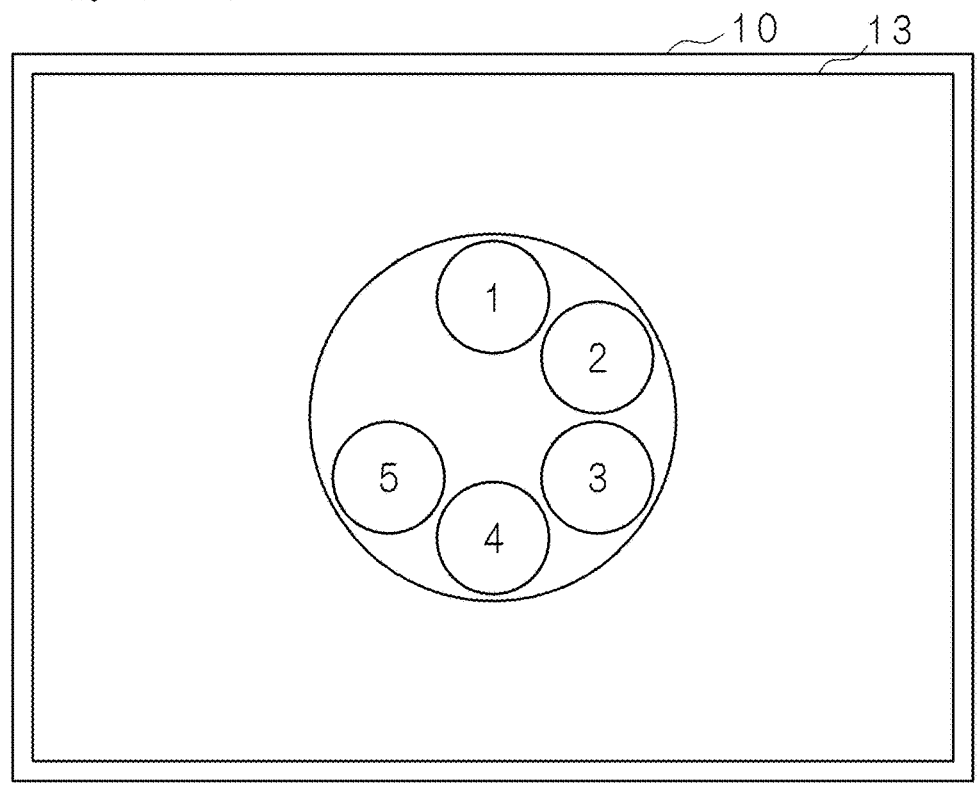
FIG. 11A is a schematic diagram illustrating a display example of an AR image.
Figure 11B:
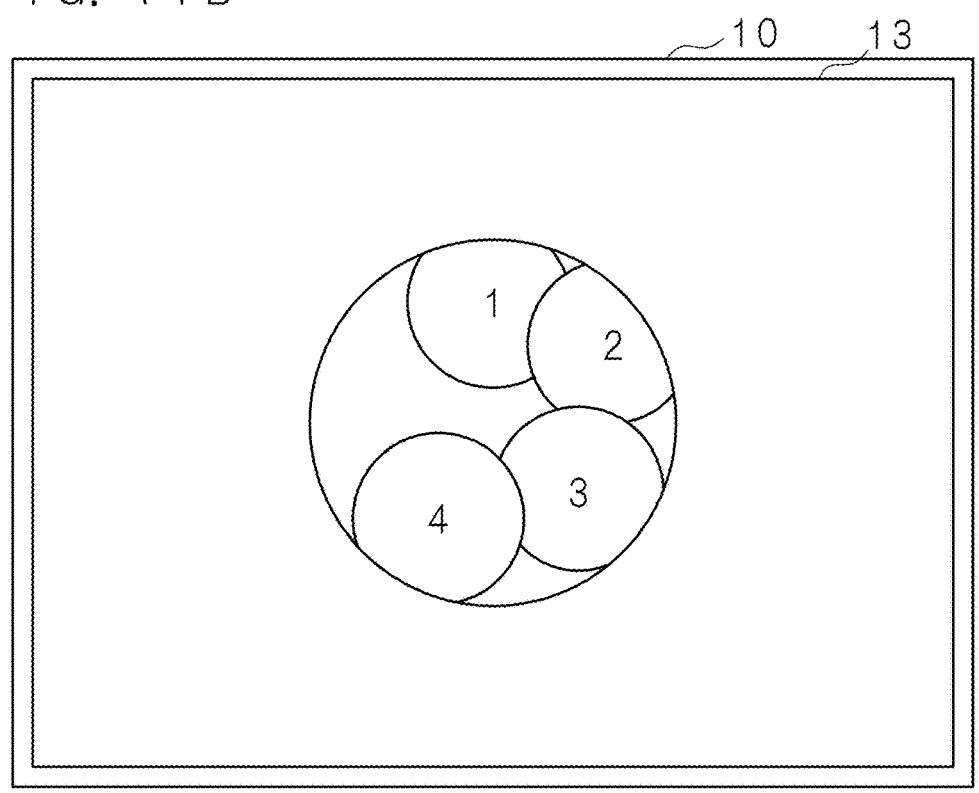
FIG. 11B is a schematic diagram illustrating another display example of the AR image.

In the AR image of the present embodiment, a plurality of contents can be displayed in a successively switched manner in the whole region of the earth ball 20 in the photographed image, and alternatively, the respective contents may be displayed in portions of the region of the earth ball 20 in the photographed image as illustrated in FIGS. 11A and 11B. FIGS. 11A and 11B are schematic diagrams illustrating display examples of the AR image. In the exemplified image of FIG. 11A, a plurality of contents are displayed in the region of the earth ball 20 in the photographed image in such a manner that they are aligned without overlapping with one another. It is noted that numerical values 1 to 5 shown in FIG. 11A correspond to the displaying order among these contents. Alternatively, the plural contents may be displayed in the region of the earth ball 20 in the photographed image in such a manner that they are partially superimposed on each other as illustrated in FIG. 11B. It is noted that numerical values 1 to 4 shown in FIG. 11B correspond to the display order among these contents. In this manner, in generating an AR image, a display form of a plurality of contents to be superimposed on the earth ball 20 in the photographed image can be appropriately changed. Besides, the display form of the contents may be changed in accordance with an instruction issued by a user. Although the displaying region of each content is in a circular shape in FIGS. 11A and 11B, it may be in a rectangular shape.

Embodiment 3

The present embodiment relates to an information processing apparatus 10 for generating an AR image in which a plurality of contents are superimposed in corresponding positions (places) on an earth ball 20 in a photographed image. Since the information processing apparatus 10 of the present embodiment has the same structure as the information processing apparatus 10 of Embodiment 2, portions commonly employed in Embodiment 2 will not be described here.

Figure 12:
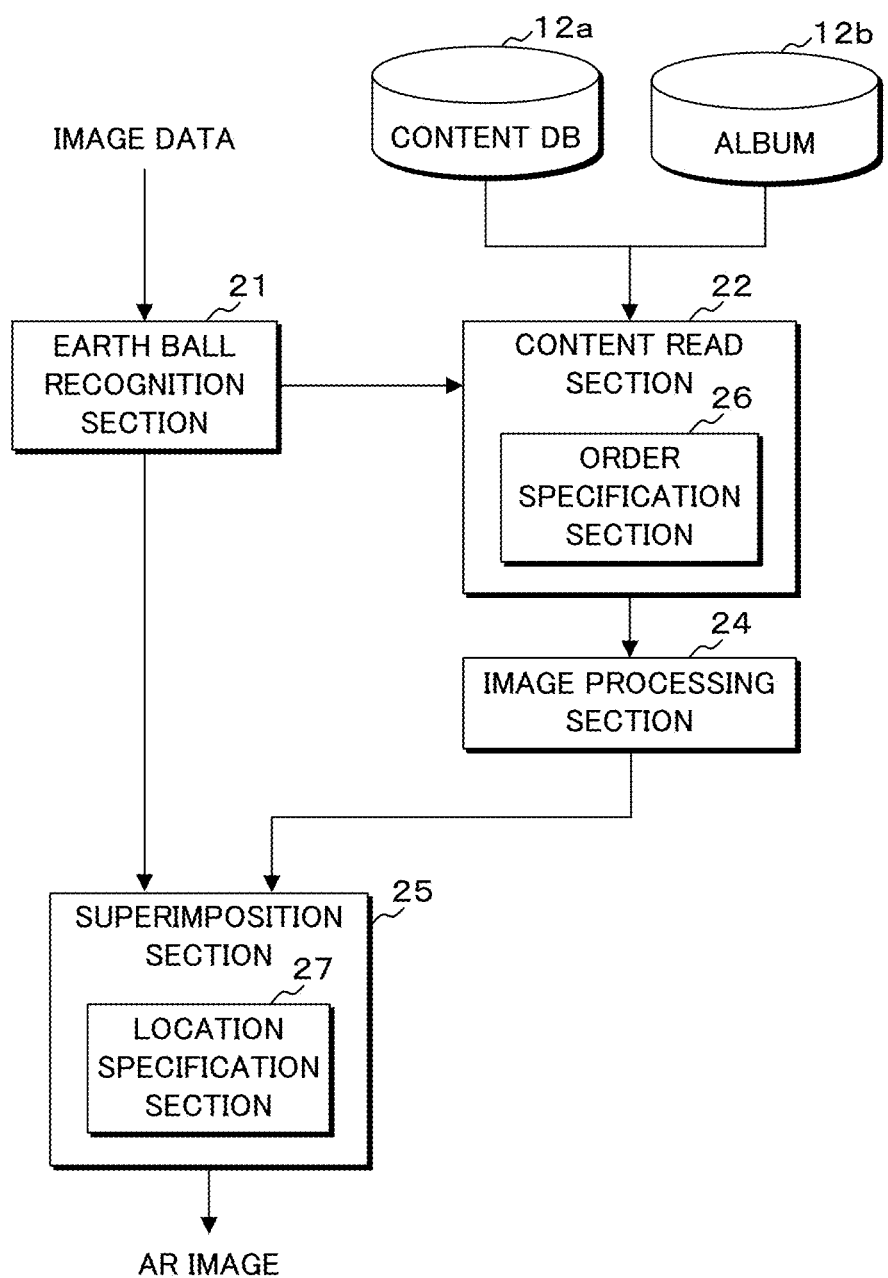
FIG. 12 is a block diagram illustrating functions realized by a control unit of an information processing apparatus according to Embodiment 3.

FIG. 12 is a block diagram illustrating functions realized by a control unit 11 of the information processing apparatus 10 of Embodiment 3. When an image processing application P is executed, the control unit 11 of the information processing apparatus 10 of the present embodiment realizes functions of an earth ball recognition section 21, a content read section 22, an image processing section 24 and a superimposition section 25 in the same manner as in Embodiment 2. Incidentally, there is no need to provide the extraction unit 23 in the present embodiment, and the superimposition section 25 includes a location specification section 27. Also in the present embodiment, a part of these functions may be realized by a dedicated hardware circuit.

When the superimposition section 25 superimposes a content on the earth ball 20 in the photographed image, the location specification section 27 specifies, based on location information of the content, a position where the content is to be superimposed. The location information is, for example, information on a position (a place) where the content is photographed or created, or information corresponding to a position (a place) where the content is to be displayed, and information on a location (such as latitude and longitude) on the earth (on a map) is used as the location information. Besides, the location information may be information corresponding to each AR marker provided on the earth ball 20. The location information is stored in the content DB 12a or the album 12b correspondingly to each content, and in the present embodiment, the location information of each content is also read from the content DB 12a or the album 12b when the content read section 22 reads the content.

When the location information of the content is information on a location on the earth, the location specification section 27 specifies a position where the content is to be superimposed on the basis of the location information of respective positions on the earth ball 20 in the photographed image, which are specified by the earth ball recognition section 21 based on AR markers, and the location information. Specifically, the location specification section 27 specifies, on the basis of the location information of respective positions on the earth ball 20 in the photographed image, which position on the earth ball 20 is a position corresponding to the location information of the content, and determines the specified position as the position where the content is to be superimposed. Alternatively, when the location information of the content is information corresponding to a corresponding AR marker, the location specification section 27 specifies the position of the corresponding marker specified by the earth ball recognition section 21 as the position where the content is to be superimposed.

The superimposition section 25 of the present embodiment generates an AR image by superimposing a content image, obtained by processing the content by the image processing section 24, in a position specified by the location specification section 27 on the earth ball 20 in the photographed image. In the present embodiment, since the content read section 22 reads a plurality of contents in the order specified by the order specification section 26, an AR image in which the contents read in the prescribed order are superimposed in the corresponding positions on the earth ball 20 can be generated. Incidentally, the superimposition section 25 may switch, at a prescribed timing, the plural contents having been successively read by the content read section 22 and processed by the image processing section 24 to be successively superimposed on the earth ball 20 in the photographed image, or may successively add, at a prescribed timing, the contents to be superimposed on the earth ball 20 in the photographed image. The information processing apparatus 10 displays, in the display section 15, the AR image thus generated by the superimposition section 25. In this manner, the information processing apparatus 10 can generate and display an AR image in which contents are superimposed in corresponding positions on the earth ball 20 photographed with the camera 16.

Figure 13:
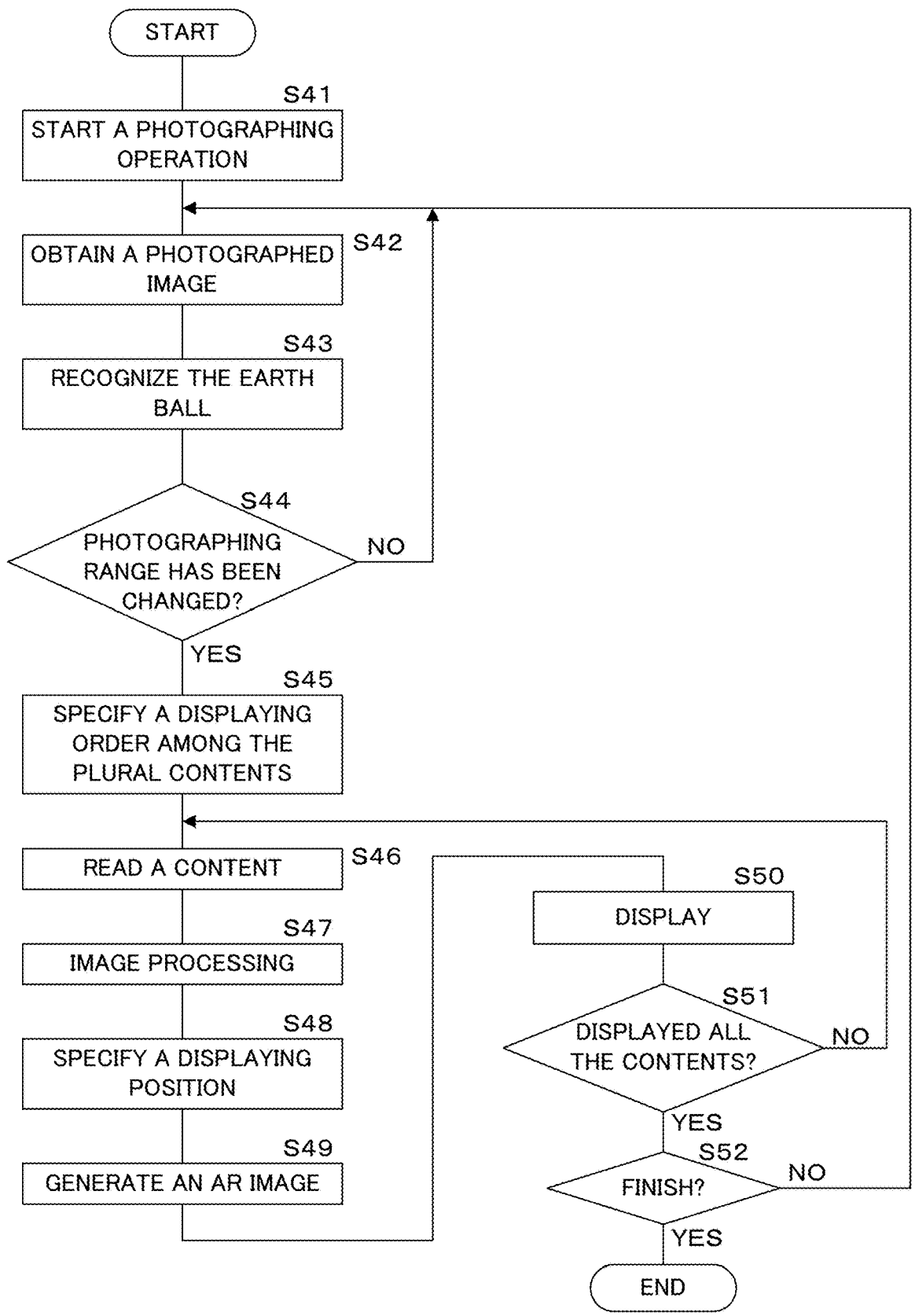
FIG. 13 is a flowchart illustrating procedures of processing performed by the information processing apparatus.

Now, AR image displaying processing performed by the information processing apparatus 10 of the present embodiment will be described with reference to a flowchart. FIG. 13 is a flowchart illustrating procedures in the processing performed by the information processing apparatus 10. FIGS. 14 to 18 are schematic diagrams illustrating display examples of the AR image. The following processing is executed by the control unit 11 in accordance with a control program stored in the storage unit 12 of the information processing apparatus 10. The control unit 11 of the information processing apparatus 10 of the present embodiment performs the same procedures as those of steps S21 to S26 of FIG. 10 (S41 to S46). Incidentally, in the present embodiment, the control unit 11 reads also the location information of the content in reading the content from the content DB 12a or the album 12b.

The control unit 11 performs the image processing on the content read in step S46 (S47). Here, the control unit 11 performs processing for generating a thumbnail image of the content if necessary. Incidentally, if there is no need to perform the image processing on the content, the control unit 11 may not perform any processing on the content. Next, the control unit 11 specifies, on the basis of the location information of the content read from the content DB 12a or the album 12b, a displaying position where the content is to be superimposed on the earth ball 20 in the photographed image (S48). Then, the control unit 11 generates an AR image by superimposing, in the specified displaying position, a content image (for example, a thumbnail image) obtained by performing the image processing on the content in step S47 (S49), and displays the AR image in the operation panel 13 (S50). In this manner, an AR image in which one content (for example, a thumbnail image) is superimposed in a corresponding position on the photographed earth ball 20 is displayed.

The control unit 11 determines whether or not the displaying (superimposing) processing has been performed on all the contents used for the AR image (S51). If it is determined that the displaying processing has not been performed on all the contents (S51: NO), the control unit 11 returns the processing to the procedure of step S46, and reads the next content from the content DB 12a or the album 12b in the displaying order specified in step S45 (S46). Then, the control unit 11 performs the procedures of steps S47 to 50 on the content thus read. If it is determined that the processing has been performed on all the contents used for the AR image (S51: YES), the control unit 11 determines whether or not the processing is to be ended (S52). If it is determined that the processing is not to be ended (S52: NO), the control unit 11 returns the processing to the procedure of step S42, and if it is determined that the processing is to be ended (S52: YES), the control unit 11 ends the processing.

Figure 14:
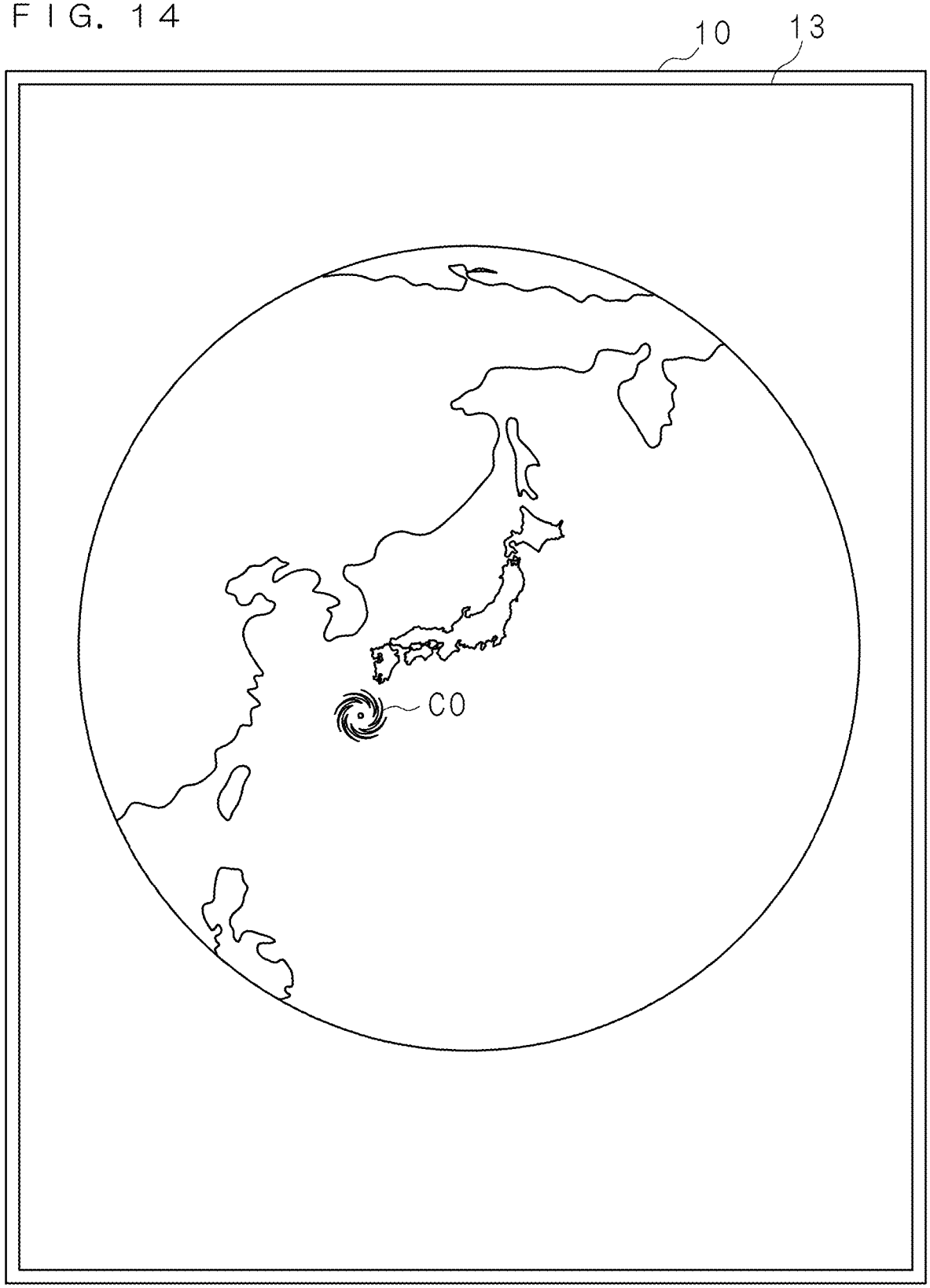
FIG. 14 is a schematic diagram illustrating a display example of an AR image.

Through the above-described processing, an AR image in which respective contents are superimposed in the corresponding positions on the earth ball 20 in the photographed image can be generated as illustrated in, for example, FIGS. 14 to 18. FIG. 14 illustrates an example of the AR image obtained when an image of a typhoon is used as a content C0. When this content C0 is used, the control unit 11 specifies a displaying position corresponding to the location information (the latitude and longitude) of the content C0 in the photographing range of the photographed earth ball 20, and superimposes the content C0 in the specified position on the earth ball 20 in the photographed image. In this manner, an AR image in which the image of the typhoon is displayed on the earth ball 20 can be generated. Incidentally, if a plurality of images together form one content, the control unit 11 can superimpose a typhoon track on the earth ball 20 by displaying the respective images in a displaying order corresponding to the time information of the respective images. Besides, when the photographing range of the earth ball 20 is changed, the control unit 11 superimposes the content (the image of the typhoon) according with the changed photographing range in the corresponding position on the earth ball 20 in the photographed image. Therefore, the earth in the AR image can be also rotated by rotating the earth ball 20 to be photographed or by changing the direction for photographing the earth ball 20, and images of typhoons formed in various places on the rotated earth are displayed.

Figure 15:
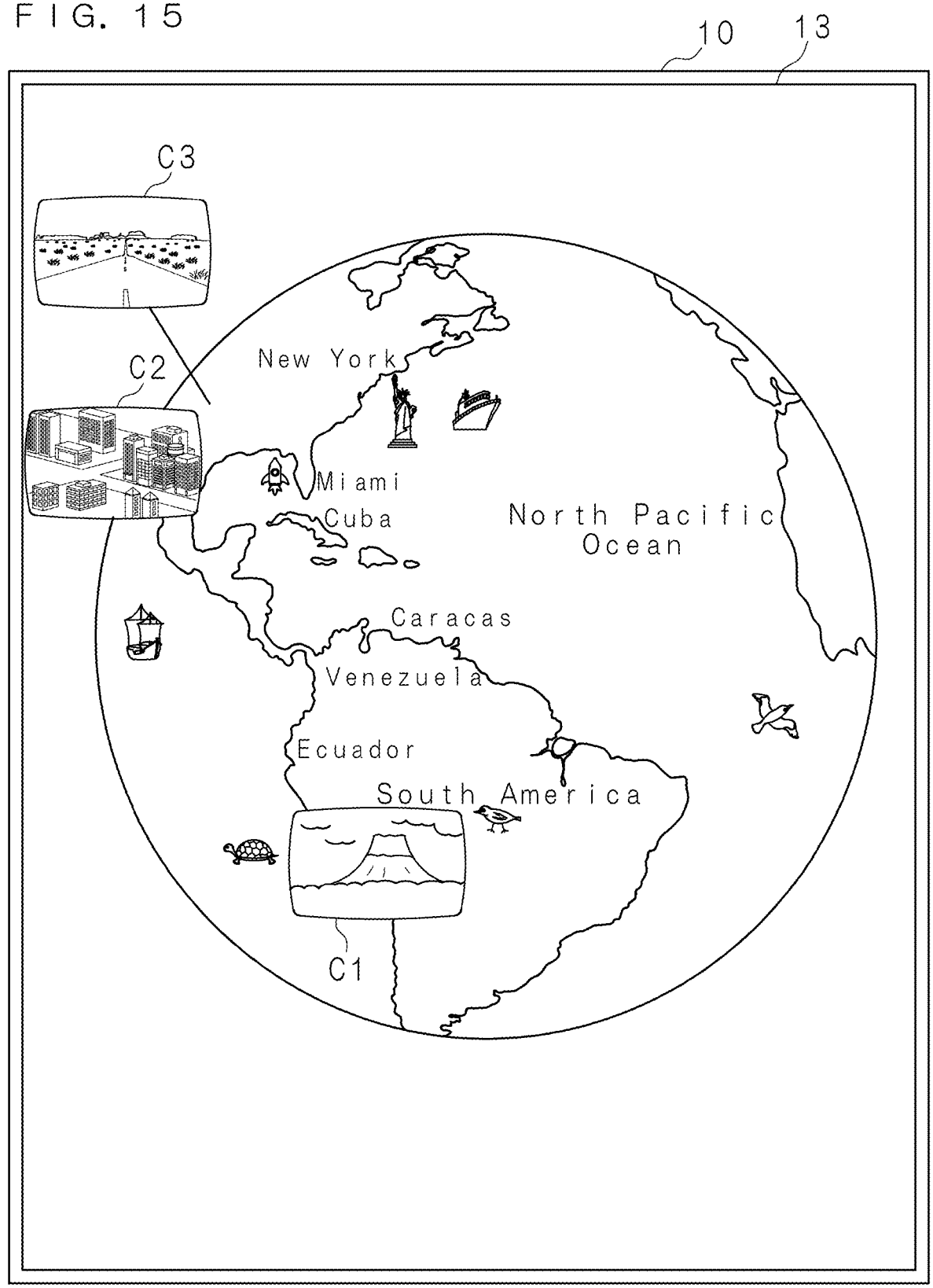
FIG. 15 is a schematic diagram illustrating another display example of the AR image.

FIG. 15 illustrates an example of the AR image obtained when photographs taken by a user during a travel are used as contents C1 to C3. When the photographs taken by a user are used as the contents, the control unit 11 reads, from the album 12b, photographs taken in respective places in the photographing range of the photographed earth ball 20. Then, the control unit 11 generates thumbnail images of the read photographs. Incidentally, when the thumbnail images of the photographs are stored in the album 12b, the control unit 11 may read the thumbnail images of the photographs from the album 12b. Besides, the control unit 11 specifies displaying positions corresponding to the location information (the latitude and longitude) of each of the contents C1 to C3 (the photographs) in the photographing range of the photographed earth ball 20. Then, the control unit 11 superimposes the contents C1 to C3 in the specified positions on the earth ball 20 in the photographed image in the photographing order of the contents C1 to C3. In this manner, the AR image in which the photographs taken during the travel are displayed in the positions corresponding to the photographing positions on the earth ball 20 in the order of taking the photographs can be generated.

Although the three contents C1 to C3 are displayed in the corresponding positions on the earth ball 20 in FIG. 15, the contents C1 to C3 may be switched at a prescribed timing to be displayed. In other words, merely one of these contents may be always superimposed on the earth ball 20. Besides, if an operation for selecting any of the contents C1 to C3 is performed through the operation panel 13 in a screen illustrated in FIG. 15, the control unit 11 may display the selected content enlarged. Specifically, the control unit 11 may read the selected content from the album 12b to display it on the top of the screen. Incidentally, also in the screen illustrated in FIG. 15, when the photographing range of the earth ball 20 is changed by rotating the earth ball 20 to be photographed or changing the direction for photographing the earth ball 20, the control unit 11 reads a content according with the changed photographing range (a photograph taken in the changed photographing range) from the album 12b, and performs similar processing. In this manner, when the photographing range of the earth ball 20 is changed by rotating the earth ball 20, an AR image in which a photograph according with the changed photographing range is superimposed can be displayed.

Figure 16:
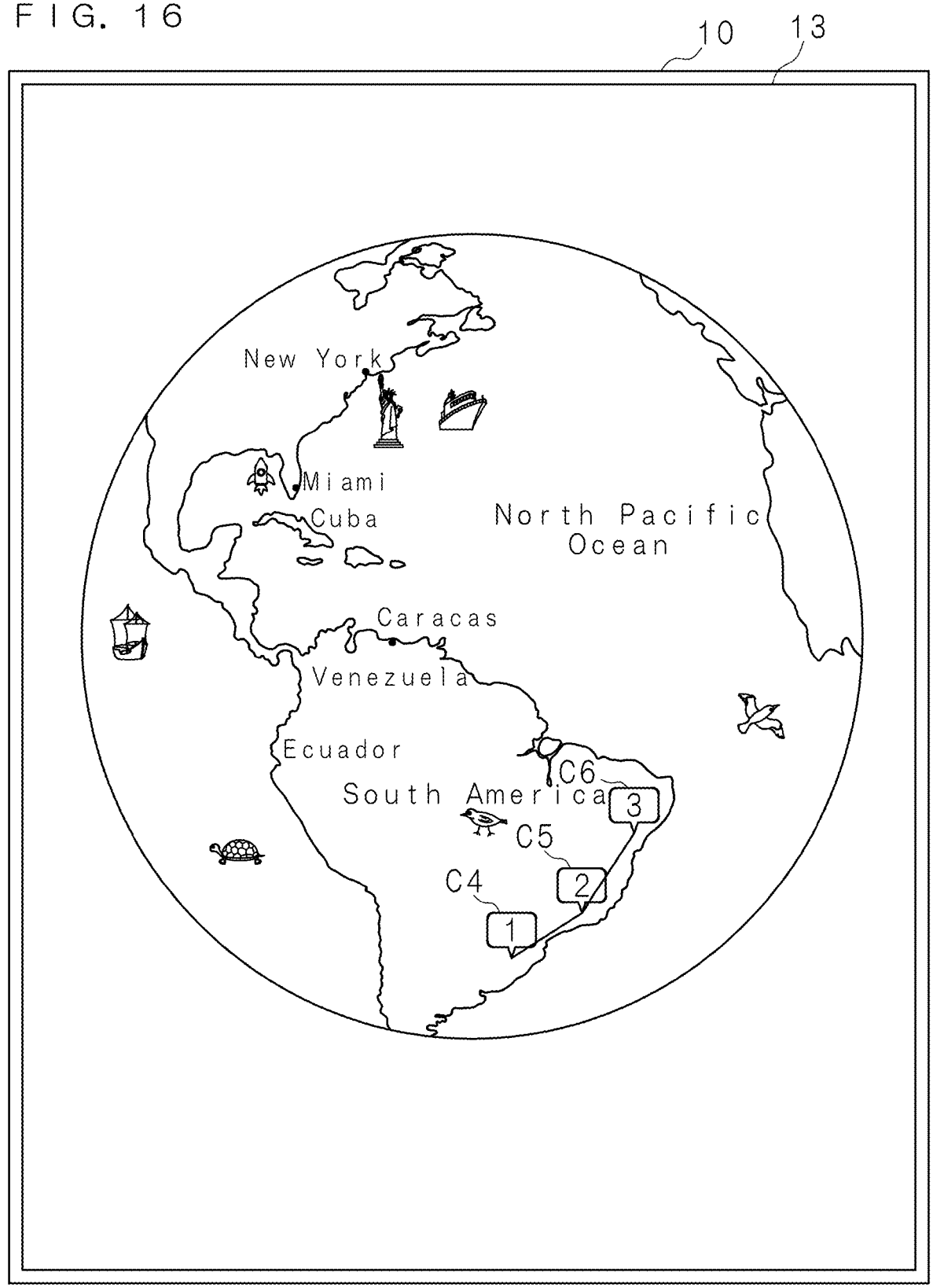
FIG. 16 is a schematic diagram illustrating still another display example of the AR image.

FIG. 16 illustrates an example of the AR image obtained when contents C4 to C6 stored, before a travel, in the content DB 12a correspondingly to location information corresponding to a place scheduled to visit during the travel and scheduled day of the visit are used. Here, the control unit 11 reads, from the content DB 12a, the location information corresponding to the places scheduled to visit in the photographing range of the photographed earth ball 20, the scheduled days of the visits corresponding to the location information and the contents C4 to C6. Then, the control unit 11 specifies, in the photographing range of the photographed earth ball 20, displaying positions of the contents C4 to C6 on the basis of the read location information (latitude and longitude). Thereafter, the control unit 11 superimposes the contents C4 to C6 in the specified positions on the earth ball 20 in the photographed image in the order of the scheduled days of the visits of the contents C4 to C6. In this manner, the AR image in which the contents C4 to C6 of, for example, icons corresponding to the order of visit are superimposed in the positions corresponding to the places scheduled to visit in the visiting order as illustrated in FIG. 16 can be generated.

In a screen illustrated in FIG. 16, the contents C4 to C6 may be icons corresponding to, for example, the scheduled days of the visits. Besides, when a line connecting the contents C4 to C6 to one another is additionally displayed as illustrated in FIG. 16, a travel route can be displayed on the earth ball 20. Furthermore, in the screen illustrated in FIG. 16, a link to a prescribed website may be set in each of the contents C4 to C6. In this case, when an operation for selecting any of the contents C4 to C6 is performed through the operation panel 13, the control unit 11 may obtain, from the website set for the selected content, information on the place of visit and display the information.

Figure 17:
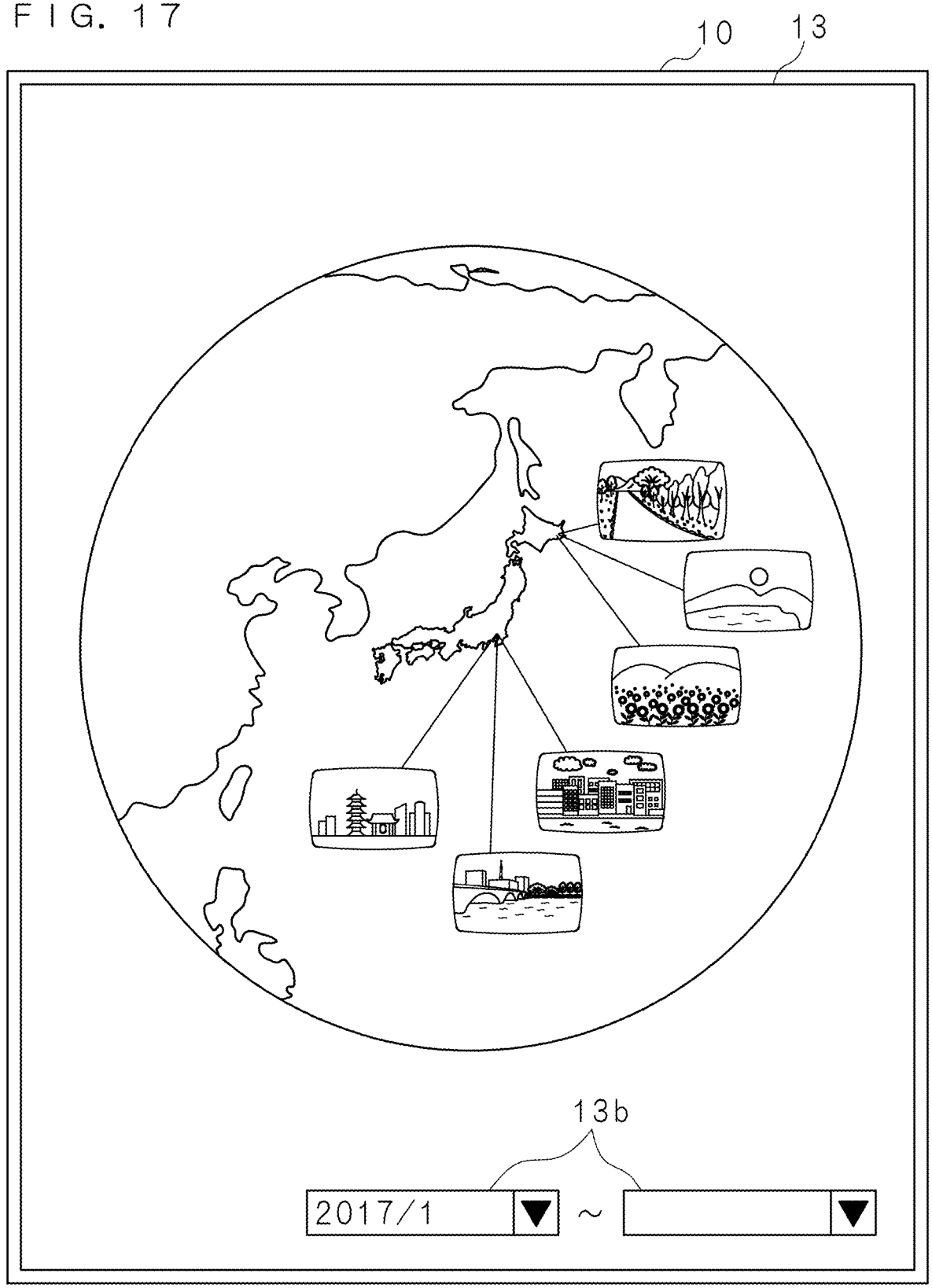
FIG. 17 is a schematic diagram illustrating still another display example of the AR image.

FIG. 17 illustrates an example of the AR image obtained when photographs taken by a user are used as the contents in the same manner as in FIG. 15. In a screen illustrated in FIG. 17, period specifying boxes 13b for specifying day and time of taking a photograph to be displayed in the AR image are additionally displayed in the screen illustrated in FIG. 15. In the display screen of FIG. 17, when a period is specified through the operation panel 13, the control unit 11 reads, from the album 12b, photographs taken in the specified period among photographs taken in the photographing range of the photographed earth ball 20 in respective places within the photographing range. Then, the control unit 11 generates thumbnail images of the read photographs, and superimposes the thumbnail images of the photographs in corresponding displaying positions on the earth ball 20 in the photographed image in the order of taking the respective photographs (contents). In this manner, the AR image in which the photographs taken in the photographing range of the earth ball 20 in the period specified by the user are displayed in the positions corresponding to the photographing positions on the earth ball 20 can be generated. Also in the screen of FIG. 17, when an operation for selecting any of the contents is performed through the operation panel 13, the control unit 11 may display the selected content enlarged. Besides, when the photographing range of the earth ball 20 is changed by rotating the earth ball 20 to be photographed or changing the direction for photographing the earth ball 20, an AR image in which contents according with the changed photographing range (photographs taken in the changed photographing range) are superimposed is displayed.

In the screen of FIG. 17, pull-down menus are set as the period specifying boxes 13b, and an arbitrary period can be set using the pull-down menus. The period specifying boxes 13b are, however, not limited to this structure. The period may be set, for example, by typing a text through the operation panel 13. Besides, an indicator for specifying, in the specified period, a year or a month and year when photographs to be displayed in the AR image were taken may be displayed. In this case, in the same manner as in the example illustrated in FIGS. 7A and 7B, the photographs taken in the year or the month and year specified using the indicator can be displayed in the AR image. In the present embodiment, contents of photographs and the like need not be stored in the storage unit 12, but may be stored in an external apparatus capable of communicating with the information processing apparatus 10 through a network, such as a cloud server. In this case, the control unit 11 may read, from the cloud server, contents of, for example, photographs taken in positions according with the photographing range of the earth ball 20 and photographs taken in the period specified by the user.

Figure 18:
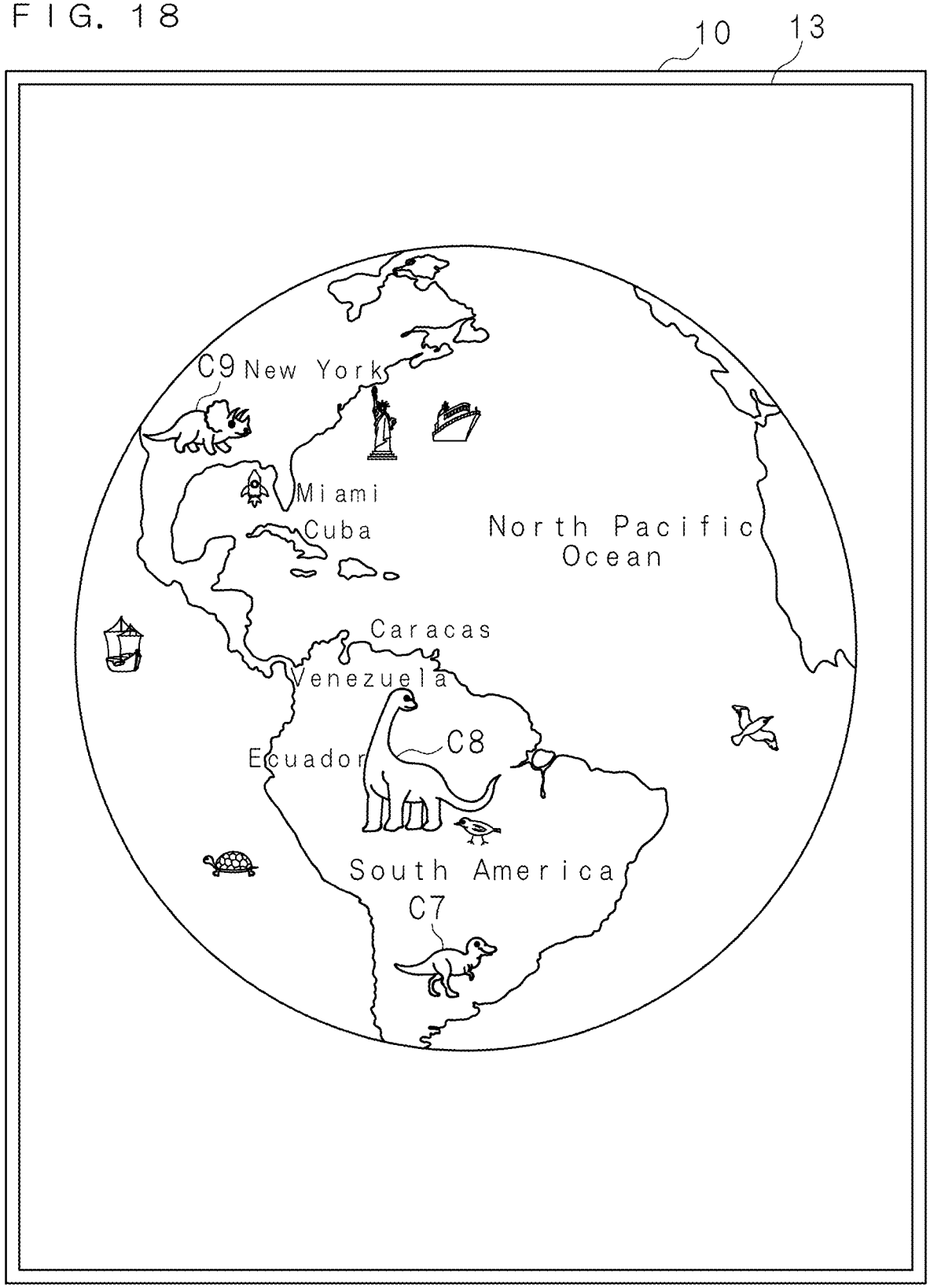
FIG. 18 is a schematic diagram illustrating still another display example of the AR image.

In the present embodiment, the location information corresponding to respective positions on the earth ball 20 (or information corresponding to respective AR markers) may be stored in the content DB 12a correspondingly to respective contents. FIG. 18 illustrates an example of the AR image obtained when images of dinosaurs living in the Triassic period, the Jurassic period, the Cretaceous period and the like in respective positions on the earth ball 20 are used as contents C7 to C9. Here, the control unit 11 reads the contents C7 to C9 corresponding to the respective positions in the photographing range of the photographed earth ball 20 from the content DB 12a, and specifies displaying positions of the contents C7 to C9 on the photographed earth ball 20. Then, the control unit 11 superimposes the contents C7 to C9 respectively in the corresponding displaying positions on the earth ball 20 in the photographed image. In this manner, the AR image of the habitats of the dinosaurs in the Triassic period, the Jurassic period, the Cretaceous period and the like can be displayed as illustrated in FIG. 18. Also in a screen illustrated in FIG. 18, when the earth ball 20 to be photographed is rotated or the direction for photographing the earth ball 20 is changed, the earth in the AR image is also rotated, and images of dinosaurs (contents) corresponding to respective locations on the rotated earth are displayed.

In the present embodiment, in addition to the above-described examples, for example, when location information of countries on the earth ball 20 and national flags of these countries are stored correspondingly in the content DB 12a, an AR image in which the national flags are superimposed in displaying positions of the respective countries on the earth ball 20 in the photographed image can be generated. Alternatively, location information on the earth ball 20 and thumbnail images of buildings or the like registered as World Heritages may be stored correspondingly in the content DB 12a. In this case, an AR image in which the thumbnail images of the World Heritages are superimposed in locations of the buildings or the like registered as the World Heritages on the earth ball 20 in the photographed image can be generated.

Furthermore, in the present embodiment, an AR image in which contents are superimposed, for example, on the basis of a flight route recorded in a flight recorder or a scheduled flight route, in positions of cities or the like on the flight route can be generated. Alternatively, an AR image in which contents corresponding to sea routes are superimposed on the earth ball 20 on the basis of sea routes employed by explorers such as Columbus, Vasco da Gama and Magellan can be generated. In this manner, the sea routes can be restored in the AR image. Besides, an AR image in which contents enabling visual grasp of landforms are superimposed in respective photographing positions in the photographing range of the earth ball 20 can be generated. When AR images are generated by using various contents according with the photographing range of the earth ball 20 as described so far, various matters can be learned by using the AR images. Alternatively, when photographs or the like taken by a user are used as the contents, AR images as desired by the user can be generated, and the user can more enjoy the photographs taken by himself/herself.

In each of the above-described embodiments, a content may be one still image, may include a plurality of still images, or may be a movie. When a content including a plurality of still images or a movie is used, the content superimposed on the photographed earth ball 20 is displayed as it is moving.

Embodiment 4

The present embodiment relates to an information processing apparatus 10 for generating an AR image on the basis of schedule information set in a scheduler. Since the information processing apparatus 10 of the present embodiment has the same structure as the information processing apparatus 10 of Embodiment 3, portions commonly employed in Embodiment 3 will not be described here. The information processing apparatus 10 of the present embodiment includes a schedule information DB 12c stored in a storage unit (schedule storage unit) 12. In the schedule information DB 12c, for example, schedule information set in a scheduler is stored, and the schedule information includes time information such as scheduled day and time of work, travel and the like, and location information of scheduled places of visit or the like.

Figure 19:
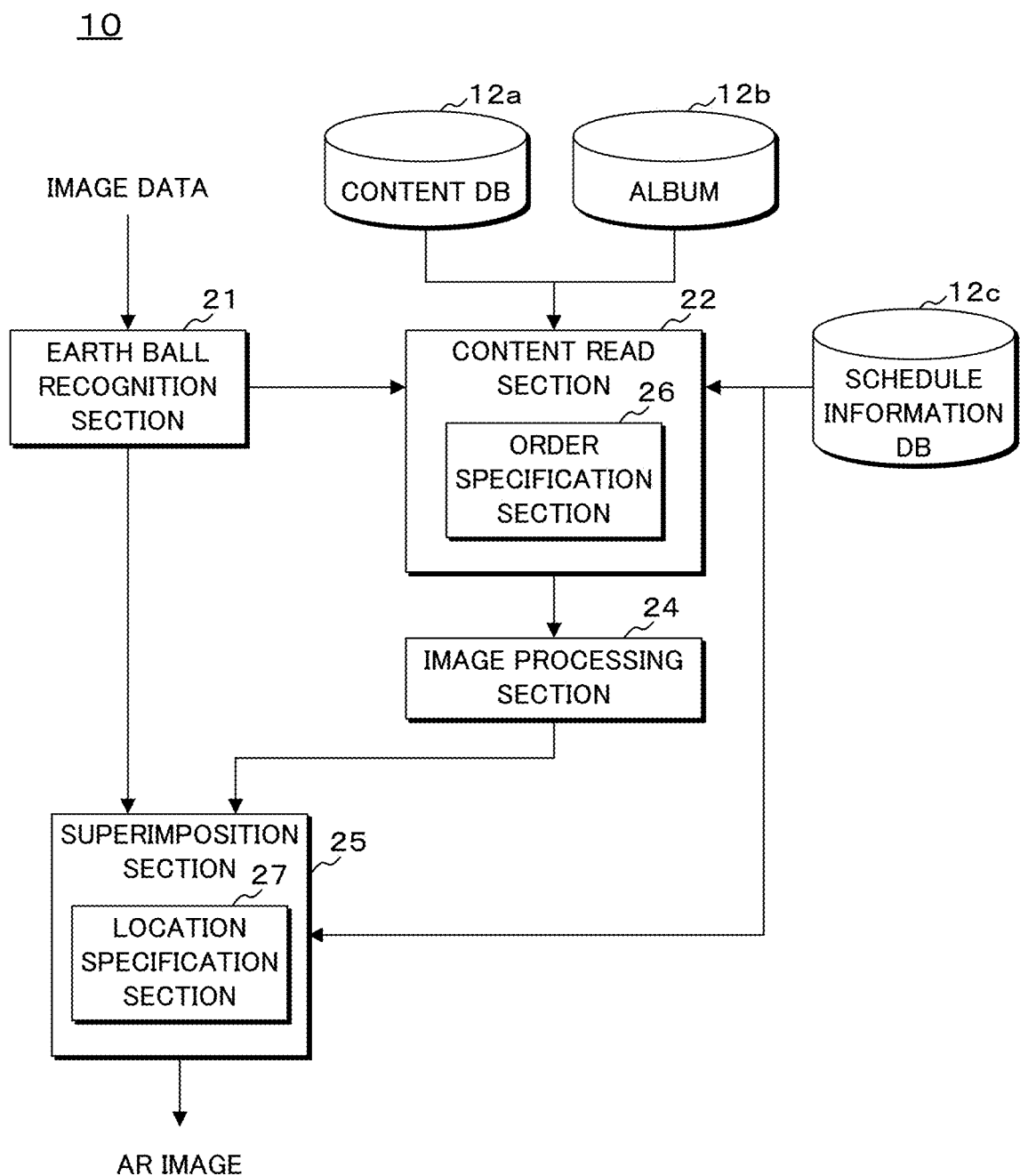
FIG. 19 is a block diagram illustrating functions realized by a control unit of an information processing apparatus according to Embodiment 4.

FIG. 19 is a block diagram illustrating functions realized by a control unit 11 of the information processing apparatus 10 of Embodiment 4. When an image processing application P is executed, the control unit 11 of the information processing apparatus 10 of the present embodiment realizes functions of an earth ball recognition section 21, a content read section 22, an image processing section 24 and a superimposition section 25 in the same manner as in Embodiment 3. Incidentally, in the present embodiment, an order specification section 26 of the content read section 22 obtains time information of schedule information from the schedule information DB 12c, and a location specification section 27 of the superimposition section 25 obtains location information of the schedule information from the schedule information DB 12c.

Figure 20:
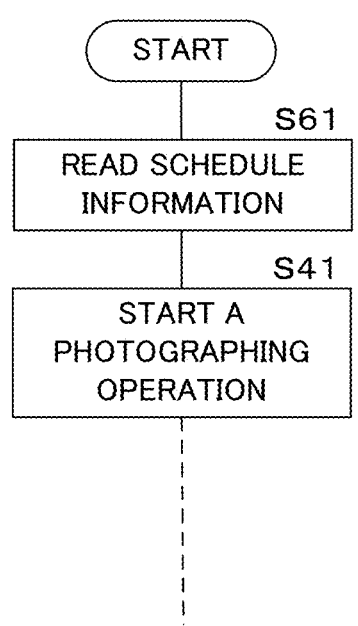
FIG. 20 is a flowchart illustrating procedures of processing performed by the information processing apparatus.

Now, AR image displaying processing performed by the information processing apparatus 10 of the present embodiment will be described with reference to a flowchart. FIG. 20 is a flowchart illustrating procedures in the processing performed by the information processing apparatus 10. The following processing is executed by the control unit 11 in accordance with a control program stored in the storage unit 12 of the information processing apparatus 10. Incidentally, in the flowchart of FIG. 20, a procedure of step S61 is additionally performed before the procedure of step S41 of FIG. 13, and the procedures of steps S42 to S52 of FIG. 13 are not illustrated in FIG. 20.

In the information processing apparatus 10 of the present embodiment, the control unit 11 reads, for example, schedule information of a travel from the schedule information DB 12c (S61). The schedule information includes, for example, location information corresponding to a place of visit during the travel and time information corresponding to day and time of the visit. The control unit 11 performs the procedures of step S41 and the following steps on the basis of the read schedule information. Specifically, in step S45, the control unit 11 specifies a displaying order among a plurality of contents to be used for an AR image on the basis of the days and times of the visits included in the read schedule information. Besides, in step S48, the control unit 11 specifies, on the basis of the location information included in the read schedule information, displaying positions in which the respective contents are to be superimposed on the earth ball 20 in the photographed image.

Incidentally, when the read schedule information is information on future schedule, namely, when it is before going the travel of the schedule information, the control unit 11 reads, in step S46, contents (such as icons) as illustrated in FIG. 16 from the content DB 12a or the album 12b. Alternatively, when the read schedule information is information on past schedule, namely, when it is after going the travel of the schedule information, the control unit 11 reads, in step S46, contents (such as photographs) according with the day and time corresponding to the time information of the schedule information, for example, as illustrated in FIG. 15 from the content DB 12a or the album 12b.

Through the above-described processing, the AR images as illustrated in FIGS. 15 and 16 can be generated in the same manner as in Embodiment 3. Specifically, the AR image in which the photographs C1 to C3 taken in respective locations are superimposed in the positions corresponding to respective visited places on the earth ball 20 as illustrated in FIG. 15 can be generated based on the schedule information. Alternatively, the AR image in which the contents C4 to C6 of icons or the like corresponding to the order of visits are superimposed in positions corresponding to respective places scheduled to visit on the earth ball 20 as illustrated in FIG. 16 can be generated based on the schedule information. In the present embodiment, contents stored in the content DB 12a and the album 12b may be still images or movies. Besides, contents of photographs or the like may be stored in, for example, a cloud server as well as stored in the storage unit 12.

Embodiment 5

The present embodiment relates to an information processing apparatus 10 for generating an AR image in which one content is superimposed to cover the whole region of an earth ball 20 in a photographed image with a plurality of contents superimposed thereon. Since the information processing apparatus 10 of the present embodiment has the same structure as the information processing apparatus 10 of Embodiment 1 or 3, portions commonly employed in Embodiments 1 and 3 will not be described here.

Figure 21:
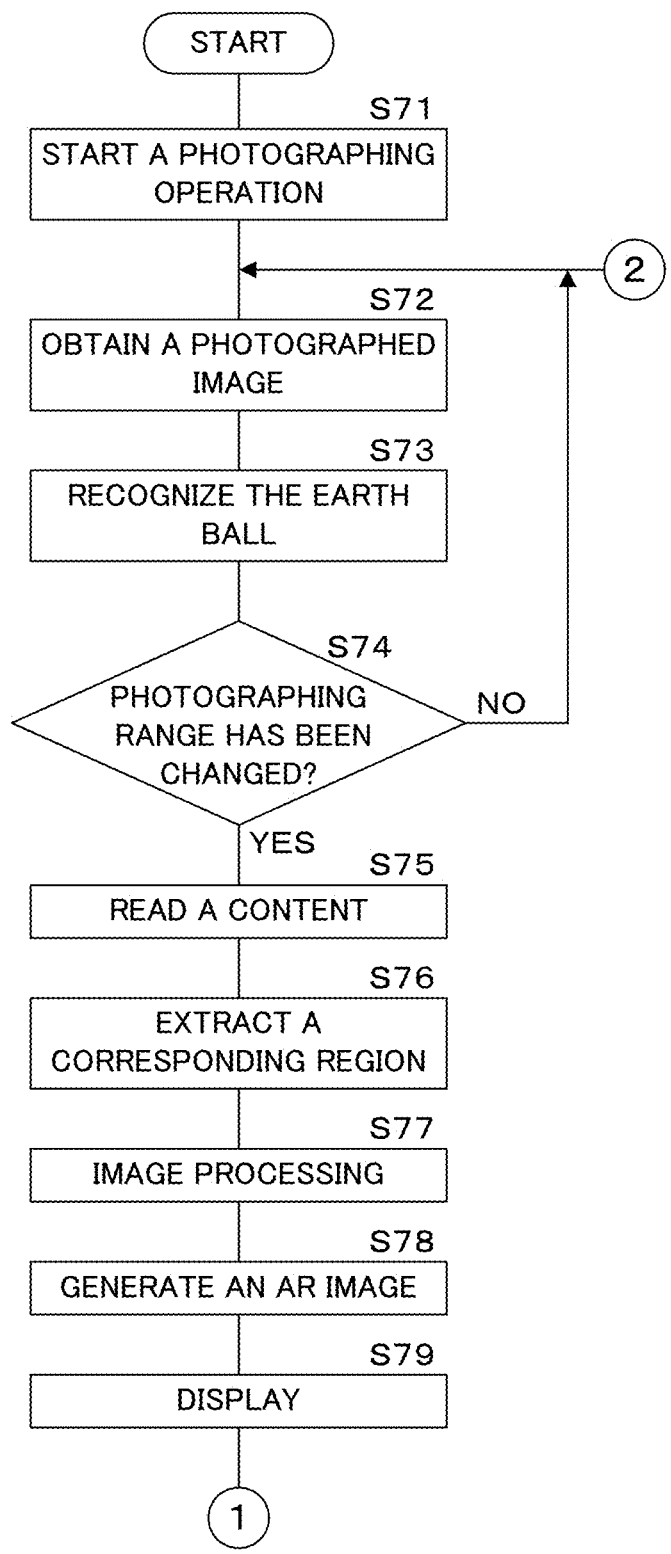
FIG. 21 is a flowchart illustrating other procedures of the processing performed by the information processing apparatus.
Figure 22:
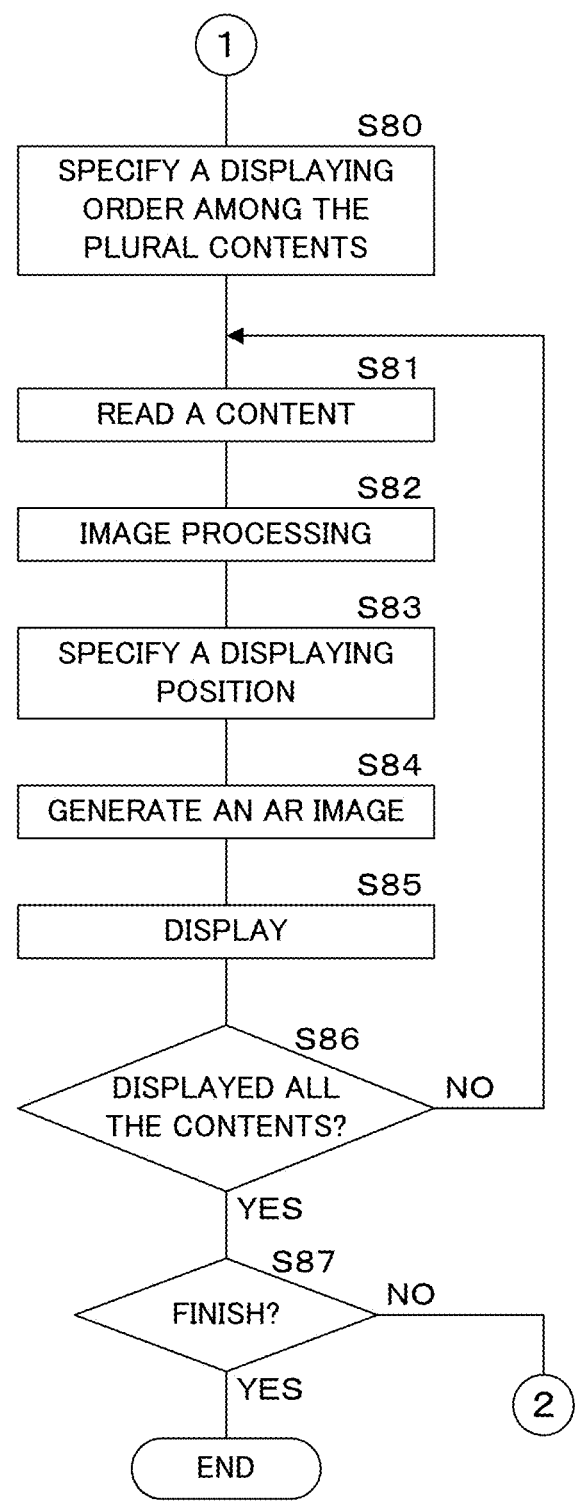
FIG. 22 is a flowchart illustrating other procedures of the processing performed by the information processing apparatus.
Figure 23:
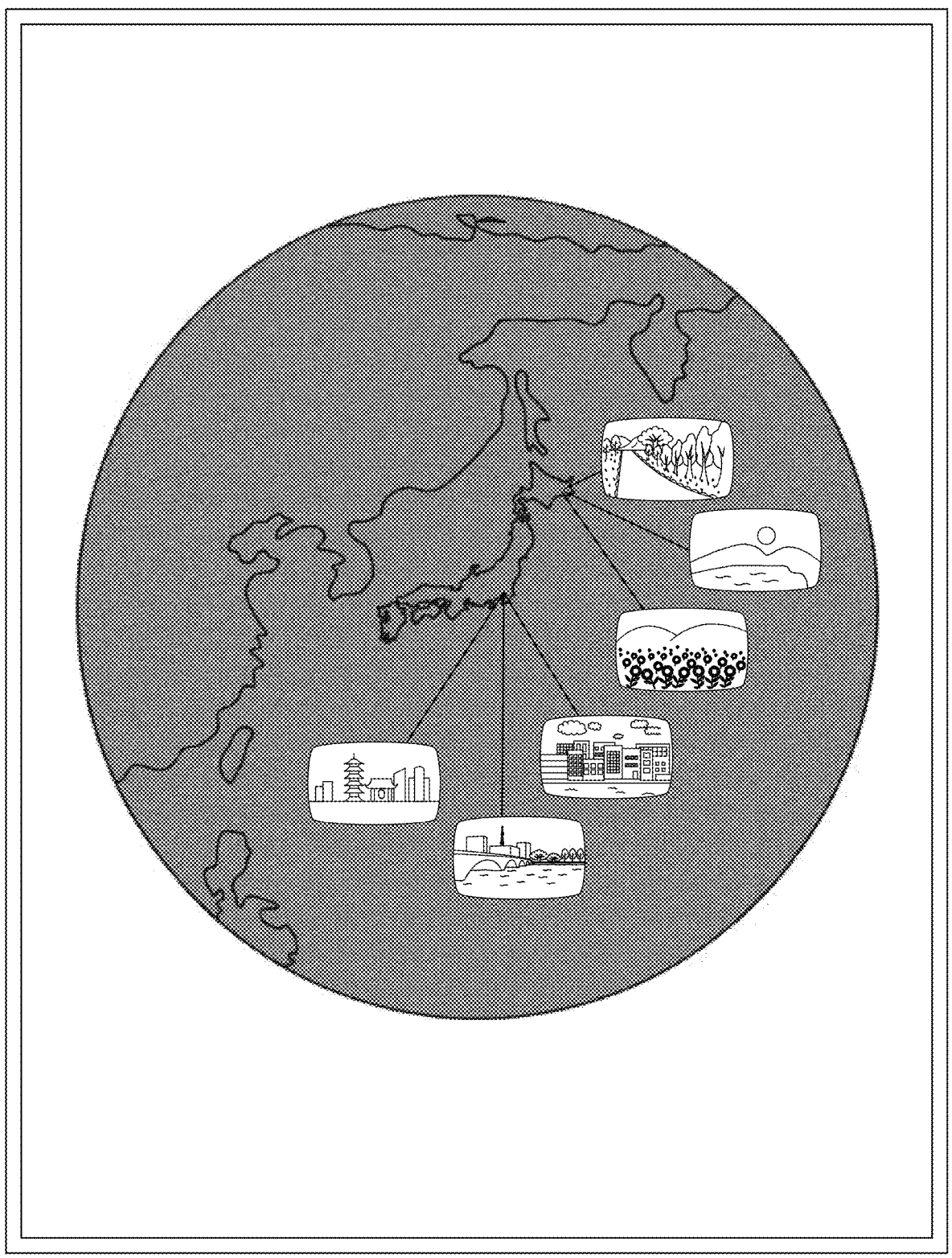
FIG. 23 is a schematic diagram illustrating a display example of an AR image.

Now, AR image displaying processing performed by the information processing apparatus 10 of the present embodiment will be described with reference to a flowchart. FIGS. 21 and 22 are flowcharts illustrating procedures in the processing performed by the information processing apparatus 10, and FIG. 23 is a schematic diagram illustrating a display example of the AR image. The following processing is executed by a control unit 11 in accordance with a control program stored in a storage unit 12 of the information processing apparatus 10. The control unit 11 of the image processing apparatus 10 of the present embodiment performs the same procedures as those of steps S1 to S9 of FIG. 4 (S71 to S79). In this manner, an AR image in which a content according with a photographing range of an earth ball 20 is superimposed on the whole region of the earth ball 20 in the photographed image is generated.

Next, the control unit 11 performs the same procedures as those of steps S45 to S51 of FIG. 13 (S80 to S86). Here, the control unit 11 performs the respective procedures based on the earth ball 20 recognized in step S73. If it is determined that the processing has been performed on all contents to be used for the AR image (S86: YES), the control unit 11 determines whether or not the processing is to be ended (S87). If it is determined that the processing is not to be ended (S87: NO), the control unit 11 returns the processing to the procedure of step S72, and if it is determined that the processing is to be ended (S87: YES), the control unit 11 ends the processing.

Through the above-described processing, an AR image in which a content is superimposed to cover the whole region of the earth ball 20 in the photographed image with thumbnail images of photographs taken in respective locations in the photographing range of the earth ball 20 further superimposed thereon as illustrated in FIG. 23 is generated. Incidentally, in the example illustrated in FIG. 23, a satellite photograph taken when it is in the nighttime in Japan is superimposed to cover the whole region of the earth ball 20, and the thumbnail images of the plural photographs are superimposed in positions corresponding to photographing positions thereof on the earth ball 20. Besides, the thumbnail images of the photographs can be displayed in an order of taking the respective photographs. In this manner, when a plurality of contents (thumbnail images) are to be displayed in the display form as illustrated in FIGS. 11A and 11B, an arbitrary content can be displayed as a background image.

Embodiment 6

In the present embodiment, an exemplified case where a medal is used as a display image will be described. When the Olympic Games, sporting events and the like are held, the number of medals won by each country with respect to each athlete and each type of medals is announced. In the present embodiment, medals are displayed to be superimposed on a photographed image of an earth ball 20. Since an information processing apparatus 10 of the present embodiment has the same structure as the information processing apparatus 10 of Embodiment 3, portions commonly employed in Embodiment 3 will not be described here.

Figure 24:
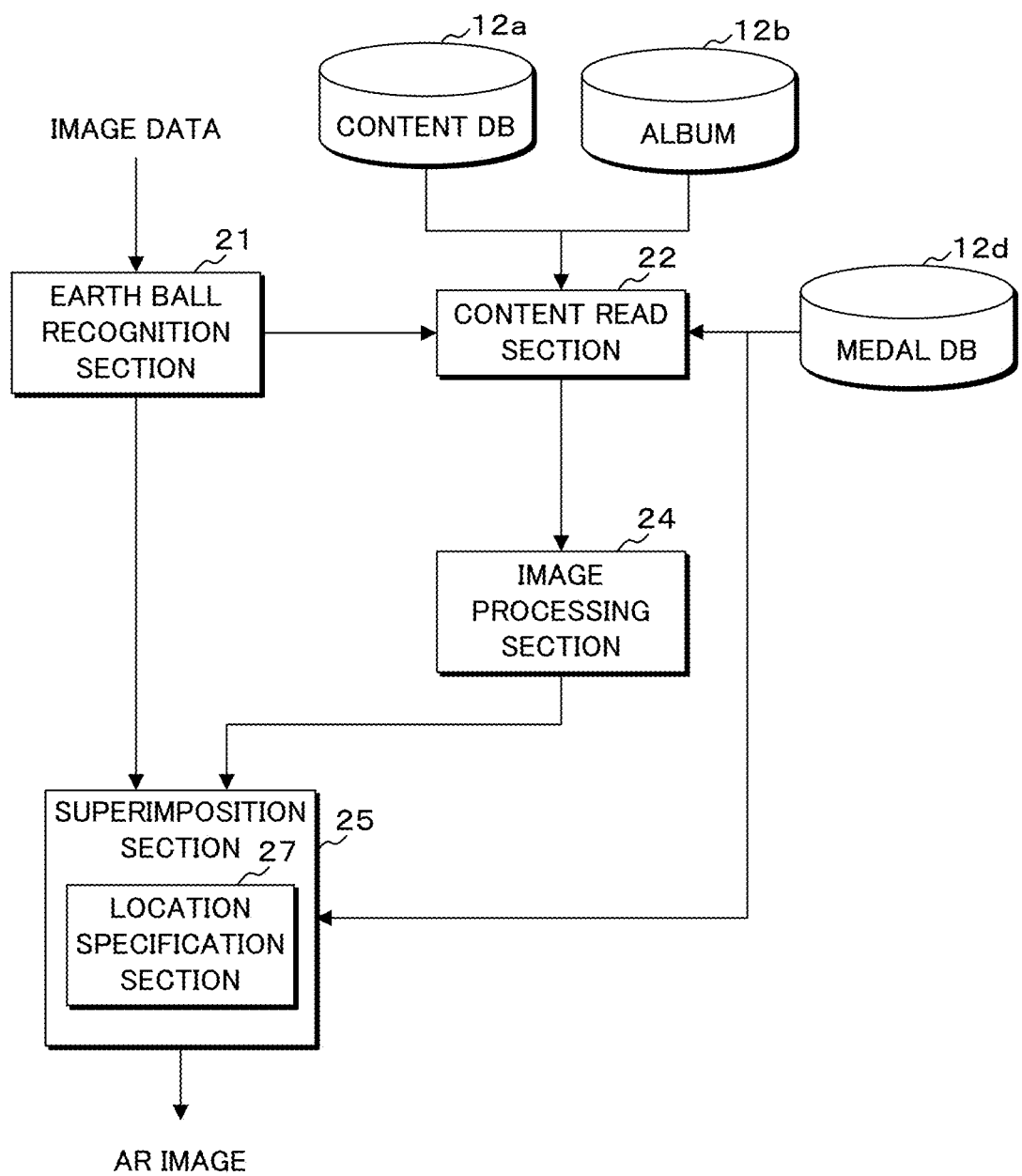
FIG. 24 is a block diagram illustrating functions realized by a control unit of an information processing apparatus according to Embodiment 6.

FIG. 24 is a block diagram illustrating functions realized by a control unit 11 of the information processing apparatus 10 of Embodiment 6. When an image processing application P is executed, the control unit 11 of the information processing apparatus 10 of the present embodiment realizes functions of an earth ball recognition section 21, a content read section 22, an image processing section 24 and a superimposition section 25 in the same manner as in Embodiment 3. Incidentally, the information processing apparatus 10 of the present embodiment includes a medal DB 12d stored in a storage unit (medal storage unit) 12. In the medal DB 12d, the number of medals won by each country with respect to each type of medals is stored. Incidentally, information stored in the medal DB 12d may be obtained through the Internet or may be manually input.

FIG. 25 is an explanatory diagram illustrating an exemplary record layout of the medal DB 12d. The medal DB 12d includes a country column, a location (latitude and longitude) column, a gold medal column, a silver medal column and a bronze medal column. The name of each country is stored in the country column. It is noted that a country code may be stored instead of the name of the country. Location information of each country is stored in the location (latitude and longitude) column. The location information includes the latitude and longitude. It is noted that the location information may be a post code of the capital or a city, an address, a name of a facility or the like. The number of won gold medals is stored in the gold medal column. The number of won silver medals is stored in the silver medal column. The number of won bronze medals is stored in the bronze medal column.

Figure 26:
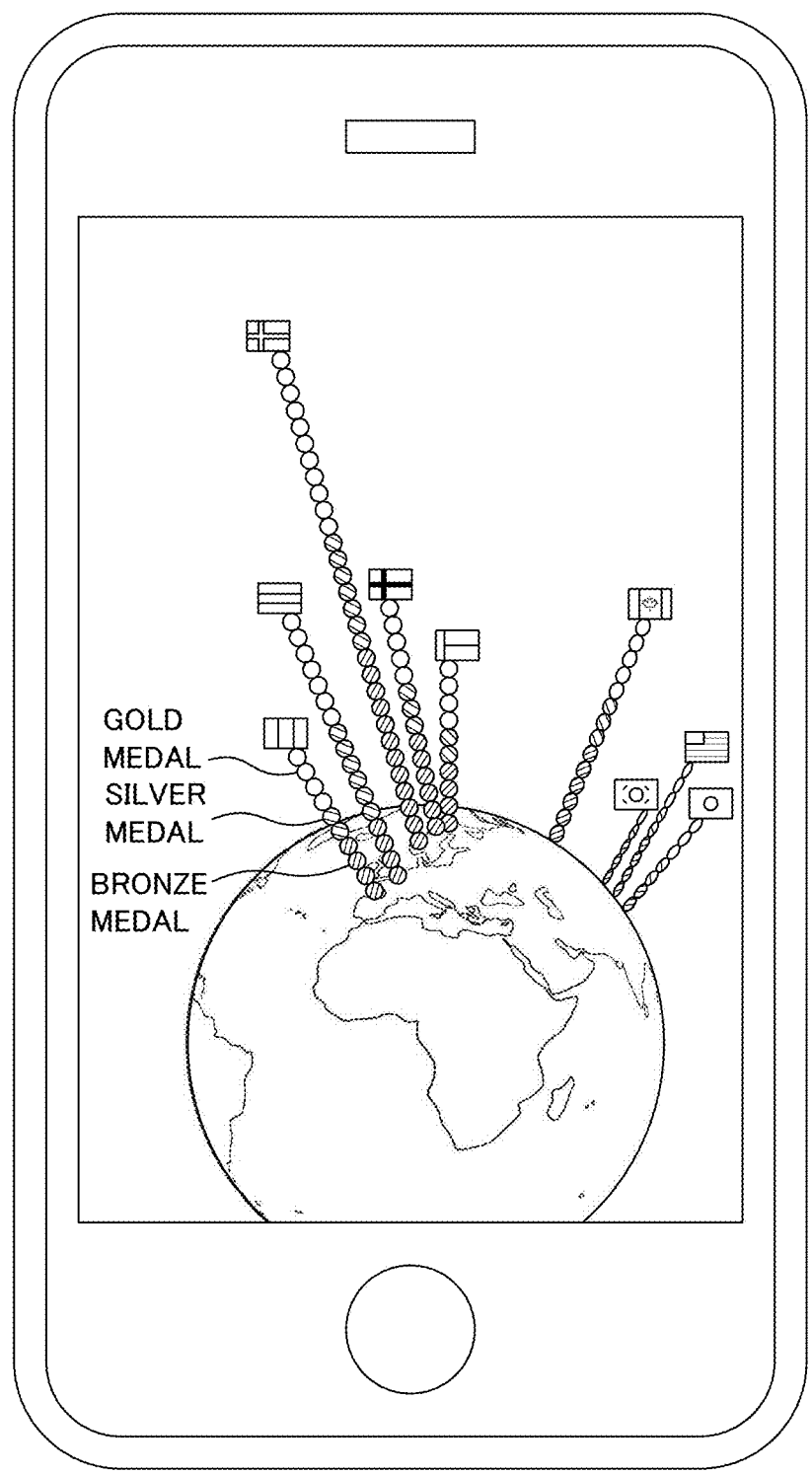
FIG. 26 is a schematic diagram illustrating a display example of an AR image obtained when a display image relating to the Olympic Games is used as a content.

FIG. 26 is a schematic diagram illustrating a display example of an AR image obtained when display images relating to the Olympic Games are used as contents. It is noted that a blank circle indicates a gold medal, a right-hatched circle indicates a silver medal and a left-hatched circle indicates a bronze medal as illustrated in this drawing. When the Olympic Games, sporting events and the like are held, the number of medals won by each country with respect to each athlete and each type of medals is announced, and this information can be displayed to be superimposed on the photographed image of the earth ball 20.

The content read section 22 reads, from the content DB 12a or the album 12b, a display image of each medal and a display image of each country, and reads, from the medal DB 12d, the number of medals won by each country with respect to each type of medals. The display image of the country is, for example, a display image of a national flag, a building, a landscape or the like representing the country. In the example described below, a national flag is used as the display image of each country. The location specification section 27 of the superimposition section 25 obtains the location information of each country from the medal DB 12d. The control unit 11 extracts a corresponding region according with the photographing range of the photographed earth ball 20, and performs processing for displaying the display image of each medal with respect to each of the countries in the extracted corresponding region.

The outline of displaying processing for bronze medals will now be described as an example. The control unit 11 selects one country from the corresponding region according with the photographing range of the photographed earth ball 20. The control unit 11 obtains the number of bronze medals won by the read country. The control unit 11 obtains the display image of the medal thus read, and makes copies of the display image of the medal in number equal to the number of the won bronze medals. For example, if the number of the won bronze medals is three, three copies of the display image of the medal are made. The control unit 11 colors the copies of the display image of the medal in bronze, stacks the copies in substantially vertical direction on the surface of the sphere of the earth ball 20 in the photographed image, and displays the resultant to be superimposed in a position on the sphere in the photographed image corresponding to the location information of the country. It is noted that display image data of each of a bronze medal, a silver medal and a gold medal may be precedently prepared.

Following the displaying processing for the display image of the bronze medal, the displaying processing for the display image of the silver medal and the displaying processing for the display image of the gold medal are performed. The displaying processing for the silver medal and the gold medal is not herein described because it can be performed in a similar manner to that for the bronze medal. After performing the displaying processing for the gold medal, the control unit 11 displays a display image of the national flag of the country in such a manner that the flag is stacked on the display image of the gold medal. Incidentally, the displaying position of the national flag is not limited to one above the display image of the gold medal but may be, for example, between any of the display images of the medals. Besides, instead of the display image of the national flag, the name of the country may be displayed in the form of a character string. Although the displaying processing is performed in the order of the bronze medal, the silver medal and the gold medal in the present embodiment, the order is not limited to this. For example, the displaying processing may be performed in the order of, for example, the gold medal, the silver medal and the bronze medal, or may be performed in a random order.

The display images of the respective medals are displayed in the corresponding colors in the present embodiment, which does not limit the present disclosure. For example, the display images of the medals may be provided with corresponding words of "gold", "silver" and "bronze" to be displayed. Incidentally, the display images of the medals are stacked in accordance with the number of won medals to be superimposed on the photographed image of the earth ball 20 in the present embodiment, which does not limit the present disclosure. For example, the information processing apparatus 10 may use a display image in a rectangular parallelepiped shape instead of the display image of the medal, so as to display the rectangular parallelepiped display image with its height adjusted in accordance with the number of won medals.

Figure 27:
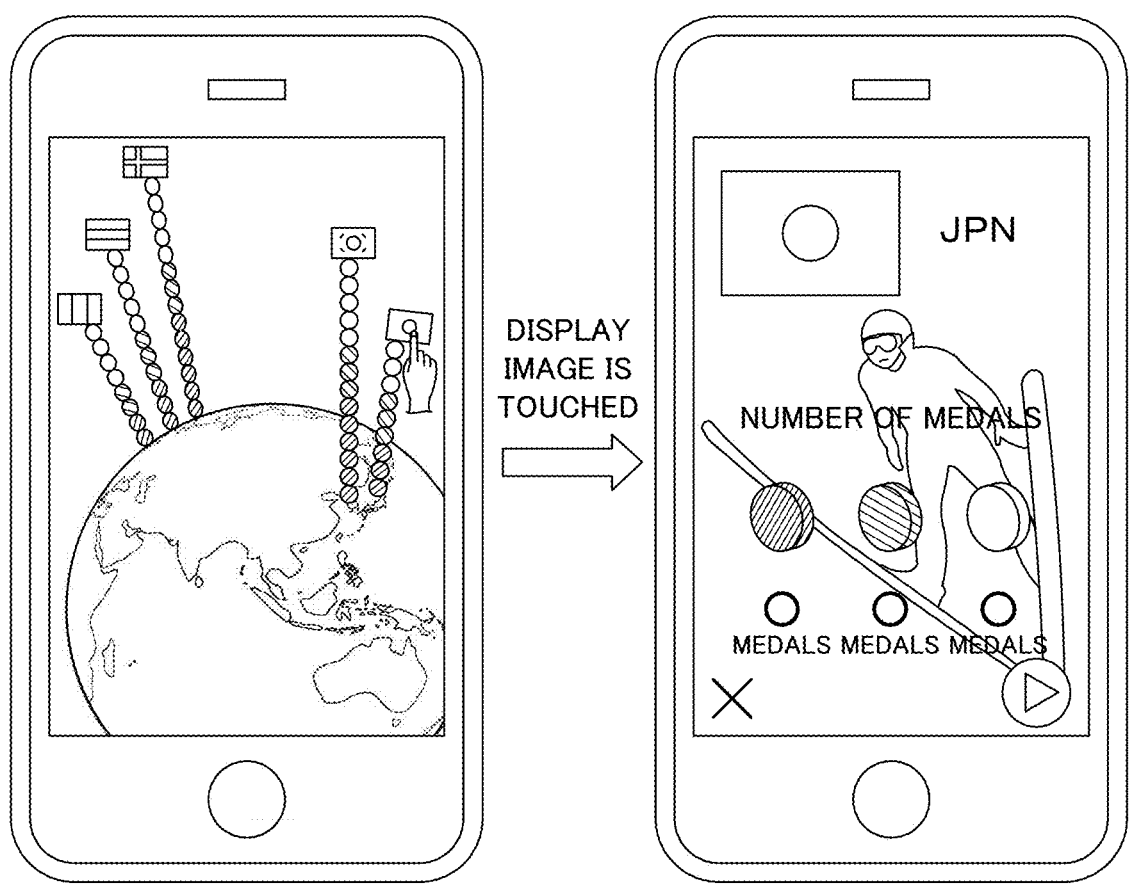
FIG. 27 is an image diagram corresponding to a display example used in transition to a hyperlink destination of a website when a display image of a national flag is tapped.

Besides, a link to a prescribed website may be set in the display image stored in the content DB 12a or the medal DB 12d. FIG. 27 is an image diagram corresponding to a display example used in transition to a website corresponding to hyperlink destination when the display image of a national flag is tapped. In this case, when an operation for selecting any of the display images of the national flags is performed through the operation panel 13, the control unit 11 may obtain detailed information on medals won by the country from the website set in the display image of the selected national flag and display the obtained information.

Figure 28:
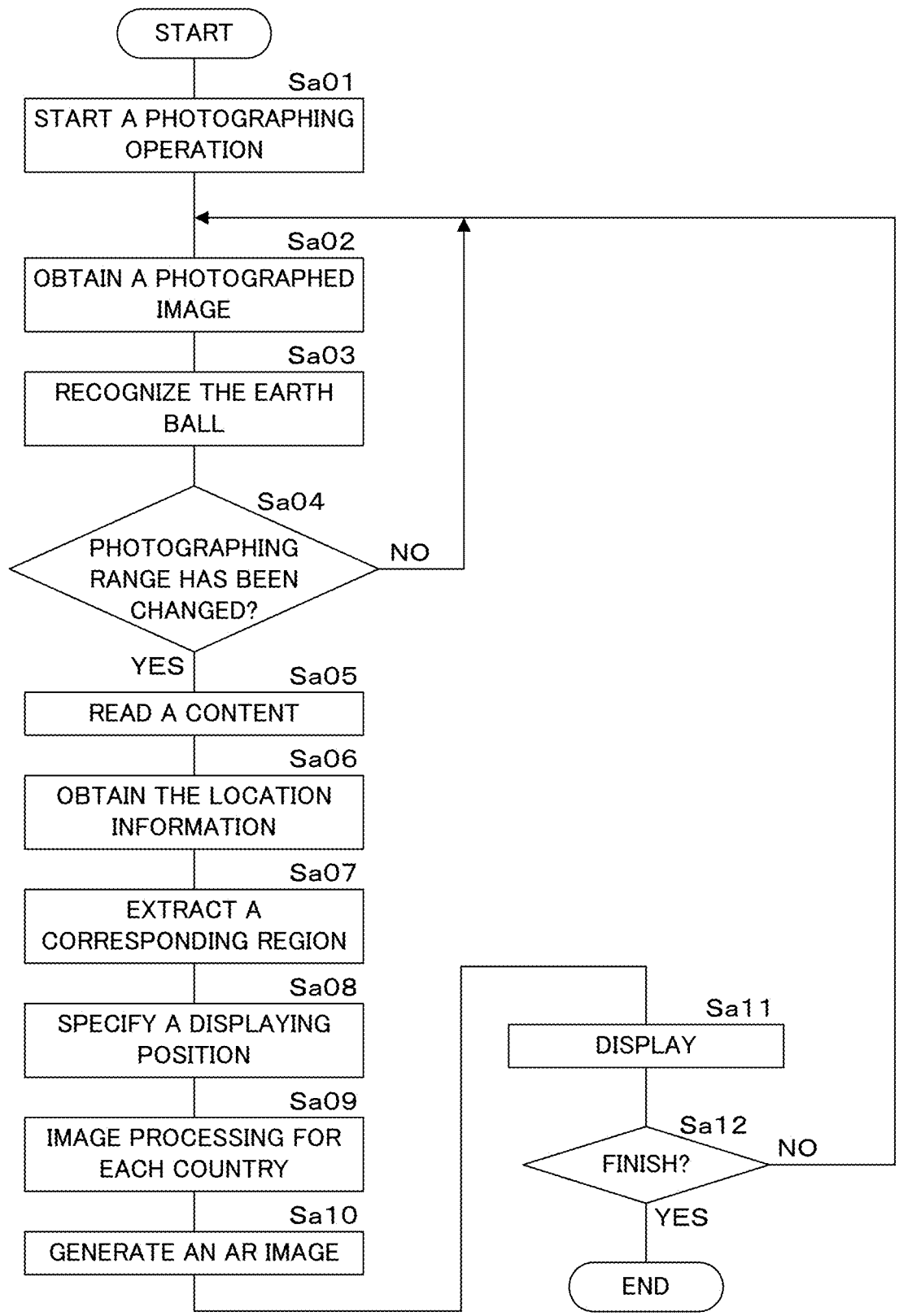
FIG. 28 is a flowchart of displaying processing for an AR image of Embodiment 6.

FIG. 28 is a flowchart of AR image displaying processing of Embodiment 6. The control unit 11 of the information processing apparatus 10 of the present embodiment performs the same procedures as those of steps S1 to S4 of FIG. 4 (Sa01 to Sa04). The content read section 22 reads contents relating to medals (Sa05). Specifically, the content read section 22 reads, from the content DB 12a or the album 12b, the display images of the medals and the display image of the national flag of each country, and reads, from the medal DB 12d, the number of medals won by the country with respect to each type of medals. The location specification section 27 of the superimposition section 25 obtains the location information of each country from the medal DB 12d (Sa06). The control unit 11 extracts a corresponding region according with the photographing range of the photographed earth ball 20 (Sa07). Incidentally, the processing for extracting the corresponding region is performed in the same manner as in the processing for extracting the corresponding region performed in Embodiment 1, and hence is not described here. The control unit 11 specifies, on the basis of the location information of each country, a displaying position in which the display images of the medals and the display image of the national flag are displayed in a superimposed manner on the earth ball 20 in the photographed image (Sa08). The control unit 11 performs processing for stacking, in accordance with the number of won medals of each type, the display images of the medals and the display image of the national flag of each country to be substantially vertical to the surface of the sphere (Sa09). Then, the control unit 11 generates, in a region of the earth ball 20 in the photographed image, an AR image obtained by using the display images processed in step Sa09 (Sa10). Thereafter, the control unit 11 of the information processing apparatus 10 performs the same procedures as those of steps S9 to S10 of FIG. 4 (Sa11 to Sa12).

The above-described embodiments are not limited in the structure in which the photographing range of the earth ball 20 is changed by changing the direction (the photographing direction) of the earth ball 20 with respect to the camera 16. The information processing apparatus 10 may employ, for example, a structure in which a region of the earth ball 20 to be displayed in the display section 15 is changed by appropriately switching a plurality of photographed images taken with a photographing position moved around the earth ball 20. In this case, the region of the earth ball 20 displayed in the display section 15 corresponds to a region of the earth ball 20 where a content is to be superimposed. When this structure is employed, the information processing apparatus 10 includes a tilt sensor or the like for detecting the inclination of the apparatus 10 itself. Then, in accordance with the inclination of the apparatus 10 itself detected by the tilt sensor, the information processing apparatus 10 rotates the earth ball 20 displayed in the display section 15 to switch the displaying region of the earth ball 20 to be displayed. Thereafter, the information processing apparatus 10 performs the same processing as described above in each embodiment on the earth ball 20 displayed in the display section 15, and thus, an AR image in which various contents are superimposed on the displayed earth ball 20 can be displayed.

Any of the technical features (the constituent features) described in the respective embodiments can be combined with each other, and such a combination can form a new technical feature.

It is to be noted that, as used herein and in the appended claims, the singular forms "a", "an", and "the" include plural referents unless the context clearly dictates otherwise.

It is to be understood that the embodiments disclosed herein are merely illustrative and not restrictive. The scope of the present invention is intended to be defined not by the above description but by the appended claims, and all changes and modifications are intended to be embraced within the scope and equivalents of the appended claims.

What is claimed is:

1. A non-transitory computer readable medium including program instructions which when executed by a processor, causes a computer to execute processing comprising:
   obtaining, by the processor, a photographed image from a camera that photographed a sphere drawn with a world map;
   recognizing, by the processor, based on a name or a mark of at least one of a sea, a continent, a country and a city included in the world map, the sphere in the photographed image obtained;
   generating, by the processor, a superimposed image obtained by superimposing a circular content image representing a state when a surface of a globe is viewed from one direction on a whole region of the recognized sphere in the photographed image; and
   displaying, by the processor, the superimposed image generated on a display.

2. The non-transitory computer readable medium according to claim 1, causing the computer to execute processing of:
   performing image processing, by the processor, on the content image in such a manner that a displaying region of the content image is the whole region of the sphere in the photographed image.

3. The non-transitory computer readable medium according to claim 1,
   wherein a plurality of content images are displayed, each image including time information, and
   the program instructions cause the computer to execute, by the processor, processing of
   generating a plurality of the superimposed images respectively corresponding to the plurality of content images, and
   displaying the superimposed images in chronological order corresponding to the time information.

4. The non-transitory computer readable medium according to claim 1,
   wherein the computer includes a storage unit storing the content image, and
   the program instructions cause the computer to execute processing of:
   generating, by the processor, the superimposed image corresponding to the content image read from the storage unit.

5. The non-transitory computer readable medium according to claim 4,
   wherein the content image is stored in an album stored in the storage unit, and
   the program instructions cause the computer to execute processing of:
   generating, by the processor, the superimposed image corresponding to an image obtained by performing image processing on the content image read from the album.

6. The non-transitory computer readable medium according to claim 1,
   wherein the content image is a movie.

7. A non-transitory computer readable medium including program instructions which, when executed by a processor, causes a computer to execute processing comprising:
   obtaining, by the processor, a photographed image from a camera that photographed an earth ball having a marker on a surface thereof;

recognizing, by the processor, based on the marker included in the photographed image, the earth ball and latitude and longitude on the earth ball in the photographed image obtained;

generating, by the processor, a plurality of superimposed images obtained by superimposing, on the recognized earth ball in the photographed image content images each including time information and location information on the photographed image in association with the location information and a location on the earth ball; and displaying, by the processor, the plurality of superimposed images generated in chronological order corresponding to the time information on a display.

8. The non-transitory computer readable medium according to claim 7, wherein the computer includes a schedule storage unit storing schedule information including the time information and the location information, and the program instructions cause the computer to execute processing of:

displaying, by the processor, the content images in positions, on the earth ball in the photographed image, based on the location information included in the schedule information and the marker in chronological order corresponding to the time information included in the schedule information read from the schedule storage unit.

9. The non-transitory computer readable medium according to claim 7, wherein the computer includes a medal storage unit storing the number of medals won by each country with respect to each type of medals and a name of the country, and the program instructions cause the computer to execute processing of:

displaying, by the processor, in a position on the earth ball in the photographed image corresponding to location information of the country, a display image of each type of the medals won by the country based on the number of medals won by the country with respect to each type of medals and the name of the country read from the medal storage unit.

10. The non-transitory computer readable medium according to claim 7, wherein the computer includes a storage unit storing the content image, and the program instructions cause the computer to execute processing of:

displaying, by the processor, the content image read from the storage unit on the earth ball in the photographed image.

11. The non-transitory computer readable medium according to claim 10, wherein the content image is stored in an album stored in the storage unit, and the program instructions cause the computer to execute processing of:

performing image processing by the processor, on the content image read from the album, and displaying the processed image on the earth ball in the photographed image.

12. The non-transitory computer readable medium according to claim 7, wherein the content image is a movie.

13. An information processing apparatus comprising a camera, a processor and a display:

the processor obtaining a photographed image from the camera that photographed a sphere drawn with a world map;

the processor recognizing the sphere in the photographed image, based on a name or a mark of at least one of a sea, a continent, a country and a city included in the world map;

the processor generating a superimposed image obtained by superimposing a circular content image representing a state when a surface of a globe is viewed from one direction on a whole region of the sphere recognized by the processor in the photographed image is covered, and the sphere is not displayed on the image; and the processor displaying the superimposed image generated on the display.

14. An information processing apparatus comprising a camera, a processor and a display:

the processor obtaining a photographed image from the camera that photographed an earth ball having a marker on a surface thereof;

the processor recognizing, based on the marker included in the photographed image, the earth ball and latitude and longitude on the earth ball in the photographed image;

the processor generating a plurality of superimposed images obtained by superimposing a plurality of content images each including time information and location information in association with the location information and a location on the earth ball on the recognized earth ball in the photographed image; and the processor displaying the plurality of superimposed images generated in chronological order corresponding to the time information on the display.

15. An information processing method for causing an information processing apparatus to perform processing of:

obtaining, by the processor, a photographed image from a camera that photographed a sphere drawn with a world map;

recognizing, by the processor, based on a name or a mark of at least one of a sea, a continent, a country and a city included in the world map, the sphere in the photographed image obtained;

generating, by the processor, a superimposed image obtained by superimposing a circular content image representing a state when a surface of a globe is viewed from one direction on a whole region of the recognized sphere in the photographed image; and displaying, by the processor, the superimposed image generated on a display.

16. An information processing method for causing an information processing apparatus to perform processing of:

obtaining, by the processor, a photographed image from a camera that photographed an earth ball having a marker on a surface thereof;

recognizing, by the processor, based on the marker included in the photographed image, the earth ball and latitude and longitude on the earth ball in the photographed image obtained;

generating, by the processor, a plurality of superimposed images obtained by superimposing on the recognized earth ball in the photographed image, a plurality of content images each including time information and location information in association with the location information and a location on the earth ball; and displaying, by the processor, the plurality of superimposed images generated in chronological order corresponding to the time information on a display.

* * * * *